United States Patent [19]
Takeshima et al.

[11] Patent Number: 5,713,199
[45] Date of Patent: Feb. 3, 1998

[54] DEVICE FOR DETECTING DETERIORATION OF $NO_x$ ABSORBENT

[75] Inventors: Shinichi Takeshima; Tetsuro Kihara; Takamitsu Asanuma, all of Susono; Toshiaki Tanaka, Numazu; Kenji Katoh, Sunto-gun; Satoshi Iguchi, Mishima, all of Japan

[73] Assignee: Toyota Jidosha Kabushiki Kaisha, Aichi, Japan

[21] Appl. No.: 624,034

[22] Filed: Mar. 27, 1996

[30] Foreign Application Priority Data

Mar. 28, 1995 [JP] Japan ................... 7-069703

[51] Int. Cl.⁶ ............... F01N 3/10; F02D 41/02
[52] U.S. Cl. ............. 60/276; 60/277; 60/285; 60/297; 60/301
[58] Field of Search .......... 60/276, 277, 285, 60/297, 301, 311; 73/118.1

[56] References Cited

U.S. PATENT DOCUMENTS

| | | | |
|---|---|---|---|
| 5,437,153 | 8/1995 | Takeshima et al. | 60/276 |
| 5,473,887 | 12/1995 | Takeshima et al. | 60/276 |
| 5,483,795 | 1/1996 | Katoh et al. | 60/276 |
| 5,577,382 | 11/1996 | Kihara et al. | 60/276 |

FOREIGN PATENT DOCUMENTS 5-106494  4/1993  Japan.
5-133264  5/1993  Japan.

OTHER PUBLICATIONS

Patent Abstracts of Japan, vol. 018, No. 691 (M-1731), Dec. 26, 1994, abstract of JP-06-272546-A (Toyota Motor Corp.), Sep. 27, 1994.
Patent Abstracts of Japan, vol. 018, No. 563 (M-1693), Oct. 27, 1994, abstract of JP-06-200737-A (Toyota Motor Corp.), Jul. 19, 1994.

*Primary Examiner*—Tony M. Argenbright
*Attorney, Agent, or Firm*—Kenyon & Kenyon

[57] ABSTRACT

A device for detecting deterioration of a $NO_x$ absorbent arranged in the exhaust passage of an engine. An $O_2$ sensor generating a current proportional to the air-fuel ratio is arranged in the exhaust passage downstream of the $NO_x$ absorbent. When the amount of $NO_x$ absorbed in the $NO_x$ absorbent is almost zero or after the amount of $NO_x$ absorbed in the $NO_x$ absorbent is made almost zero, the air-fuel ratio of the air-fuel mixture is changed from lean to rich, and the amount of oxygen stored in the $NO_x$ absorbent is detected from the output signal of the $O_2$ sensor at this time. Further, the $NO_x$ absorbing capability is found by using this detected oxygen amount.

35 Claims, 22 Drawing Sheets

DEVICE FOR DETECTING DETERIORATION OF NO$_x$ ABSORBENT

BACKGROUND OF THE INVENTION

1. Field of the Invention

The present invention relates to a device for detecting deterioration of a NO$_x$ absorbent used in an engine.

2. Description of the Related Art

In an engine, a three-way catalyst is conventionally arranged in the engine exhaust passage so as to purify the exhaust gas. This three-way catalyst has an O$_2$ storage function of absorbing and storing the excess oxygen existing in the exhaust gas when the air-fuel ratio of the air-fuel mixture supplied into the engine cylinder becomes larger than the stoichiometric air-fuel ratio, that is, becomes lean, and releasing the stored oxygen when the air-fuel ratio of the air-fuel mixture supplied into the engine cylinder becomes smaller than the stoichiometric air-fuel ratio, that is, becomes rich. Accordingly, when the air-fuel ratio of the air-fuel mixture is alternately changed to the rich side or lean side of the stoichiometric air-fuel ratio, due to the O$_2$ storage function possessed by the three-way catalyst, when the air-fuel ratio of the air-fuel mixture becomes lean, the excess oxygen is attracted by the catalyst and stored, so the NO$_x$ is reduced, and when the air-fuel ratio of the air-fuel mixture becomes rich, the oxygen stored in the catalyst is released, so the HC and CO are oxidized. This means that the NO$_x$, HC, and CO can be simultaneously removed.

Accordingly, in an engine provided with a three-way catalyst, conventionally, an air-fuel ratio sensor for detecting the air-fuel ratio of the air-fuel mixture supplied into the engine cylinder is arranged in the exhaust passage upstream of the catalyst, the amount of supply of fuel is increased when the air-fuel ratio of the air-fuel mixture becomes lean, and the amount of supply of fuel is decreased when the air-fuel ratio of the air-fuel mixture becomes rich, whereby the air-fuel ratio is alternately changed to the rich side or lean side of the stoichiometric air-fuel ratio thereby to simultaneously reduce the NO$_x$, HC, and CO.

In such an engine, however, when the three-way catalyst deteriorates, the rate of purification of the exhaust gas is lowered. In this case, since the exhaust gas is purified by the O$_2$ storage function possessed by the three-way catalyst, the deterioration of the catalyst means the lowering of the O$_2$ storage function. In other words, if the lowering of the O$_x$ storage function can be detected, it becomes possible to detect the deterioration of the catalyst.

Therefore, there is known an internal combustion engine wherein an air-fuel ratio sensor is arranged in the exhaust passage downstream of the three-way catalyst and, after the air-fuel ratio of the air-fuel mixture supplied into the engine cylinder is held lean for a predetermined time for example, the air-fuel ratio is changed to rich and the degree of deterioration of the three-way catalyst is detected from the time until the air-fuel ratio detected by the air-fuel ratio sensor changes from lean to rich after the switching from lean to rich (refer to Japanese Unexamined Patent Publication (Kokai) No. 5-133264). Namely, the lower the O$_2$ storage function, the shorter the elapsed time until the air-fuel ratio detected by the air-fuel ratio sensor changes from lean to rich after the air-fuel ratio of the air-fuel mixture supplied into the engine cylinder is changed from lean to rich. Accordingly, in this engine, it is decided that the shorter this elapsed time, the higher the degree of deterioration of the three-way catalyst.

On the other hand, there is also known an engine in which an NO$_x$ absorbent which absorbs NO$_x$ when the air-fuel ratio of the air-fuel mixture is lean and releases the absorbed NO$_x$ when the air-fuel ratio of the air-fuel mixture becomes rich is arranged in the engine exhaust passage. In this engine, when a lean air-fuel mixture is burned, the NO$_x$ contained in the exhaust gas is absorbed into the NO$_x$ absorbent, and when the NO$_x$ absorbed in the NO$_x$ absorbent should be released, the air-fuel ratio of the air-fuel mixture is made rich.

This NO$_x$ absorbent, however, also has an O$_2$ storage function similar to that of the three-way catalyst. In addition to the NO$_x$ absorbing and releasing action, oxidation reduction of the unburnt HC and CO and NO$_x$ based on this O2 storage function is carried out. Accordingly, also in this NO$_x$ absorbent, if the O$_2$ storage function is lowered, the oxidation reduction action becomes weak and thus this means the deterioration of the NO$_x$ absorbent.

In this NO$_x$ absorbent, however, not only is the excess oxygen absorbed into the NO$_x$ absorbent and stored therein when the air-fuel ratio of the air-fuel mixture is made lean, but also the stored oxygen is released from the NO$_x$ absorbent and the absorbed NO$_x$ is simultaneously released from the NO$_x$ absorbent when the NO$_x$ is absorbed into the NO$_x$ absorbent and the air-fuel ratio of the air-fuel mixture is changed from lean to rich. In this case, however, the time elapsed after the air-fuel ratio of the air-fuel mixture is changed from lean to rich to when the detected air-fuel ratio by the air-fuel ratio sensor provided downstream of the NO$_x$ absorbent changes from lean to rich becomes shorter as the amount of oxygen stored in the NO$_x$ absorbent is smaller and becomes shorter as the amount of NO$_x$ absorbed in the NO$_x$ absorbent is smaller. Namely, this elapsed time is proportional to the sum of the amount of oxygen stored in the NO$_x$ absorbent and the amount of NO$_x$ absorbed in the NO$_x$ absorbent.

Accordingly, in the NO$_x$ absorbent, when it is decided that the amount of oxygen absorbed in the NO$_x$ absorbent is small since this elapsed time becomes shorter, that is, when it is decided that the O$_2$ storage function is lowered, an erroneous decision will be carried out. Further, when it is simultaneously decided that the amount of NO$_x$ absorbed in the NO$_x$ absorbent is small since this elapsed time becomes shorter, that is, when it is decided that the NO$_x$ absorbing capability is lowered, an erroneous decision will be made.

SUMMARY OF THE INVENTION

An object of the present invention is to provide a engine for detecting a deterioration of a NO$_x$ absorbent, which is capable of accurately detecting a degree of deterioration of a NO$_x$ absorbent.

According to the present invention, there is provided a device for detecting deterioration of a NO$_x$ absorbent arranged in an exhaust passage of an engine, the NO$_x$ absorbent absorbing NO$_x$ and storing oxygen therein when an air-fuel ratio of exhaust gas flowing into the NO$_x$ absorbent is lean and releasing absorbed NO$_x$ and stored oxygen therefrom when the air-fuel ratio of exhaust gas flowing into the NO$_x$ absorbent becomes rich, the device comprising air-fuel ratio detecting means arranged in the exhaust passage downstream of the NO$_x$ absorbent for producing an output signal indicating an air-fuel ratio of exhaust gas which flows out from the NO$_x$ absorbent; air-fuel ratio changing means for changing the air-fuel ratio of exhaust gas flowing into the NO$_x$ absorbent from lean to rich when an amount of NO$_x$ absorbed in the NO$_x$ absorbent is almost zero; and oxygen amount detecting means for detecting an amount of oxygen stored in the NO$_x$ absorbent on the basis of the output signal of the air-fuel ratio detecting means after the air-fuel ratio of exhaust gas flowing into the $NO_x$ absorbent is changed from lean to rich by the air-fuel ratio changing means.

BRIEF DESCRIPTION OF THE DRAWINGS

The present invention may be more fully understood from the description of the preferred embodiments of the invention set forth below with reference to the accompanying drawings, wherein.

DESCRIPTION OF THE PREFERRED EMBODIMENTS

Figure 1:
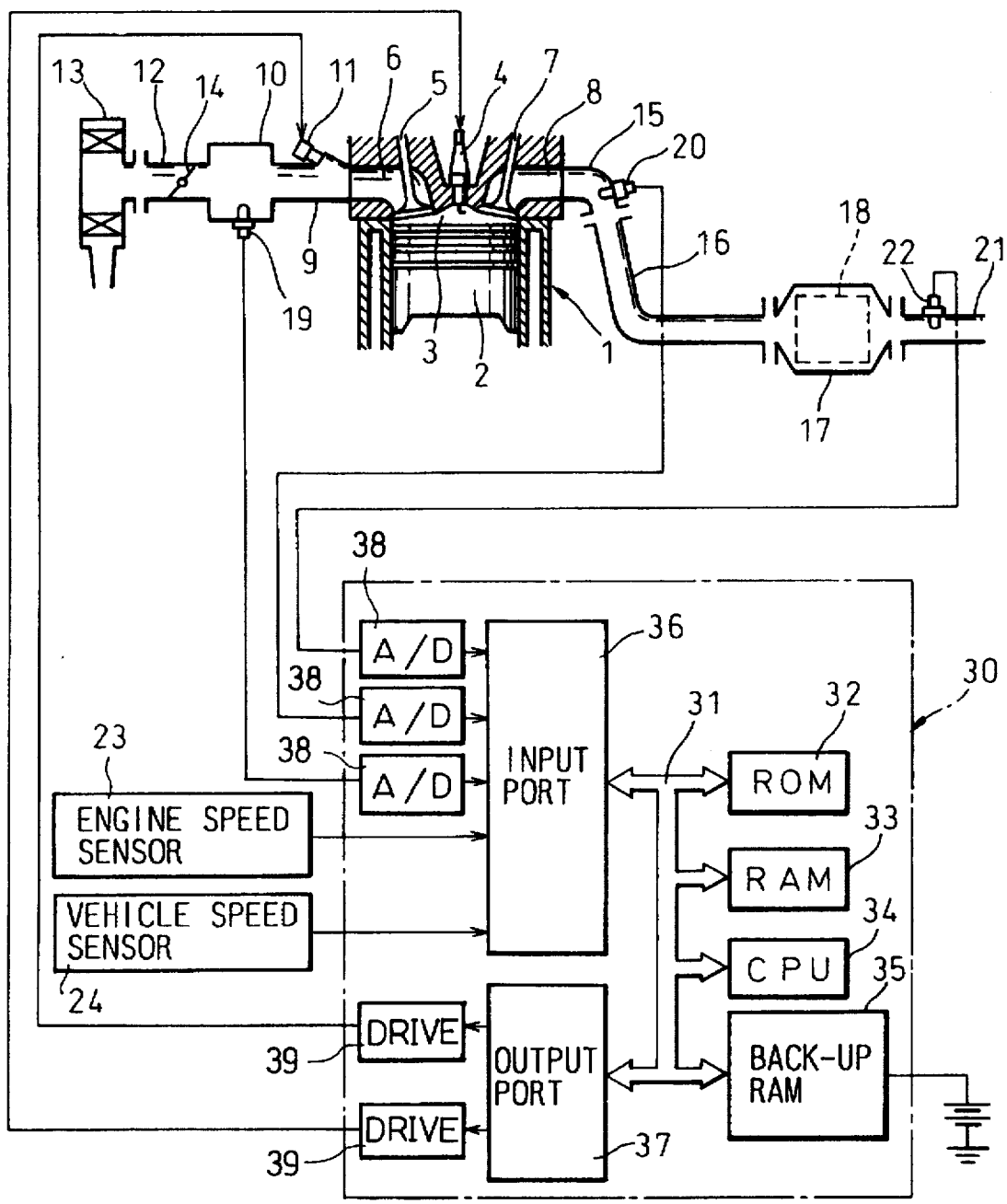
FIG. 1 is an overall view of an engine.

Referring to FIG. 1, 1 denotes an engine body, 2, a piston, 3, a combustion chamber, 4, a spark plug, 5, an intake valve, 6, an intake port, 7, an exhaust valve, and 8, an exhaust port. The intake port 6 is connected to a surge tank 10 via a corresponding branch pipe 9, and a fuel injector 11 injecting fuel toward the interior of the input port 6 is attached to each branch pipe 9. The surge tank 10 is connected via an intake duct 12 to an air cleaner 13, and a throttle valve 14 is arranged in the intake duct 12. On the other hand, the exhaust port 8 is connected via an exhaust manifold 15 and an exhaust pipe 16 to a casing 17 containing a $NO_x$ absorbent 18.

An electronic control unit 30 comprises a digital computer and is provided with a read only memory (ROM) 32, a random access memory (RAM) 33, a microprocessor (CPU) 34, a back-up RAM 35 continuously connected to a power source, an input port 36, and an exhaust port 37 all of which are connected to each other by a bi-directional bus 31. In the surge tank 10, a pressure sensor 19 for generating an output voltage proportional to an absolute pressure in the surge tank 10 is arranged. The output voltage of this pressure sensor 19 is input to the input port 36 via a corresponding analog-to-digital (AD) converter 38. An air-fuel ratio sensor (hereinafter referred to as an $O_2$ sensor) 20 is arranged in the exhaust manifold 15, and the output of this $O_2$ sensor 20 is input to the input port 36 via the corresponding AD converter 38. Another air-fuel ratio sensor (hereinafter referred to as an $O_2$ sensor) 22 is arranged in the exhaust pipe 21 downstream of the $NO_x$ absorbent 18. This $O_2$ sensor 22 is connected to the input port 36 via a corresponding AD converter 38. Further, an engine speed sensor 23 generating an output pulse representing the engine speed and a vehicle speed sensor 24 generating an output pulse representing the vehicle speed are connected to the input port 36. On the other hand, the output port 37 is connected via the corresponding drive circuit 39 to the spark plug 4, fuel injection valve 11, and the alarm lamp 25.

In the engine shown in FIG. 1, a fuel injection time TAU is calculated on the basis of for example the following equation:

$$TAU=TP \cdot K \cdot FAF$$

Figure 2:
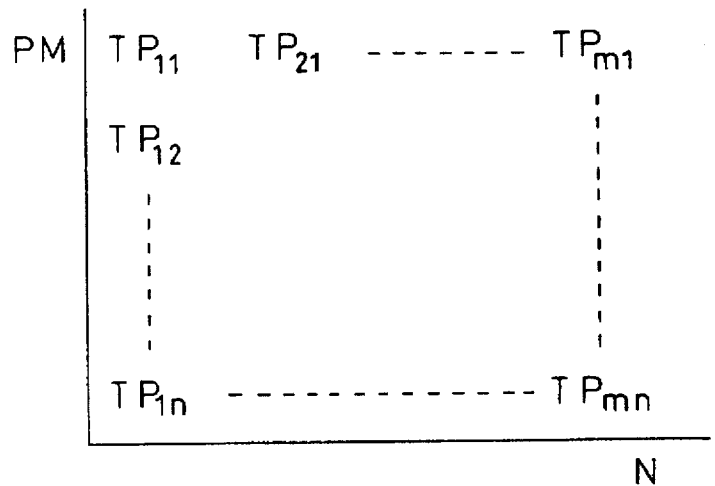
FIG. 2 is a view of a map of a basic fuel injection time.

Here, TP represents a basic fuel injection time, K, a correction coefficient, and FAF, a feedback correction coefficient, respectively. The basic fuel injection time TP indicates a fuel injection time necessary for making the air-fuel ratio of the air-fuel mixture to be supplied into the engine cylinder the stoichiometric air-fuel ratio. This basic fuel injection time TP is found in advance by experiments and preliminarily stored in the ROM 32 in the form of a map as shown in FIG. 2 as a function of the absolute pressure PM in the surge tank 10 and the engine rotation speed N. The correction coefficient K is a coefficient for controlling the air-fuel ratio of the air-fuel mixture to be supplied into the engine cylinder. If K=1.0, the air-fuel ratio of the air-fuel mixture to be supplied into the engine cylinder becomes the stoichiometric air-fuel ratio. Contrary to this, when K becomes smaller than 1.0, the air-fuel ratio of the air-fuel mixture to be supplied into the engine cylinder becomes larger than the stoichiometric air-fuel ratio, that is, lean, and when K becomes larger than 1.0, the air-fuel ratio of the air-fuel mixture supplied into the engine cylinder becomes smaller than the stoichiometric air-fuel ratio, that is, rich.

The feedback correction coefficient FAF is a coefficient for making the air-fuel ratio accurately coincide with the stoichiometric air-fuel ratio on the basis of the output signal of the $O_2$ sensor 20 when K=1.0, that is, when the air-fuel ratio of the air-fuel mixture supplied into the engine cylinder should be made the stoichiometric air-fuel ratio. This feedback correction coefficient FAF moves up or down around about 1.0. The FAF is decreased when the air-fuel mixture becomes rich and increased when the air-fuel mixture becomes lean. Note that, when K<1.0 or K>1.0, the FAF is fixed to 1.0.

Figure 3:
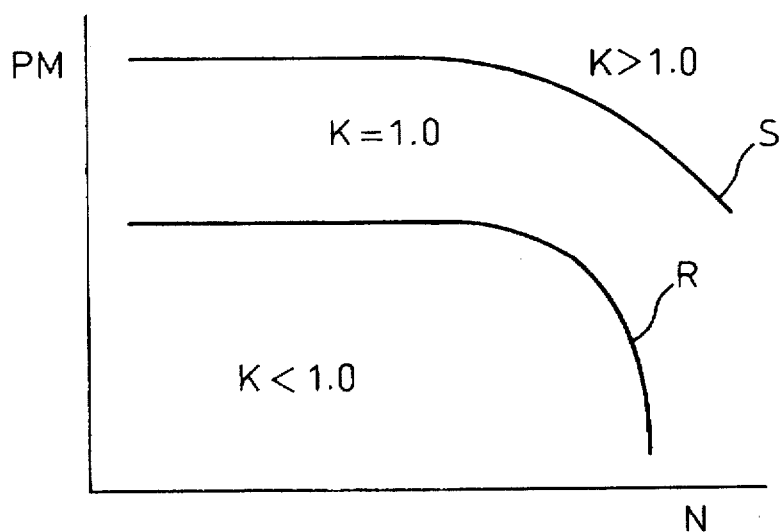
FIG. 3 is a view of a correction coefficient K.

The target air-fuel ratio of the air-fuel mixture which should be supplied into the engine cylinder, that is, the value of the correction coefficient K, is changed in accordance with the operating state of the engine. In the embodiment according to the present invention, basically, as shown in FIG. 3, it is determined in advance as a function of the absolute pressure PM in the surge tank 10 and the engine speed N. Namely, as shown in FIG. 3, in a low load operation region on the lower load side from a solid line R, K becomes smaller than 1.0, that is, the air-fuel ratio of the air-fuel mixture is made lean, and in a high load operation region between the solid line R and solid line S, K becomes equal to 1.0, that is, the air-fuel ratio of the air-fuel mixture is made the stoichiometric air-fuel ratio. In the full load operation region on the higher load side from the solid line S, K becomes larger than 1.0, that is, the air-fuel ratio of the air-fuel mixture is made rich.

Figure 4:
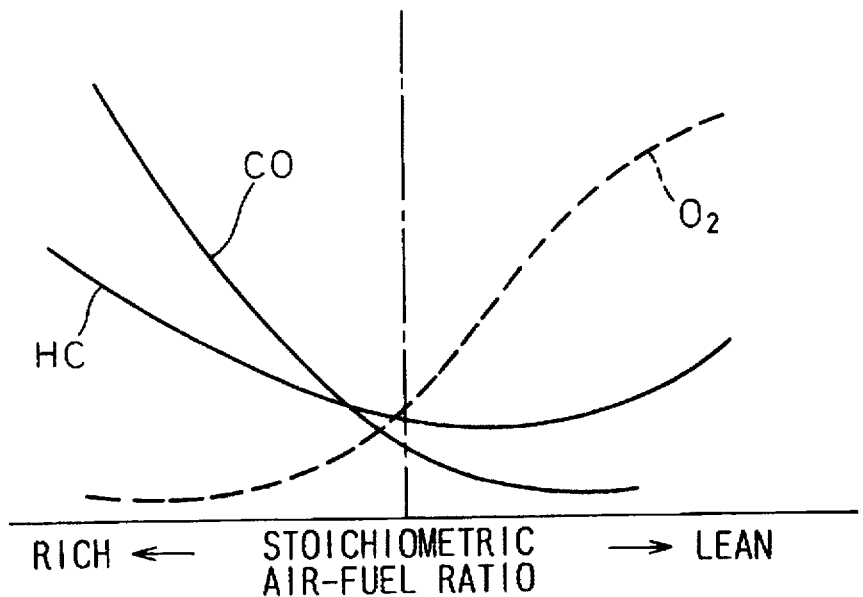
FIG. 4 is a graph schematically showing a concentration of unburnt HC and CO and oxygen in exhaust gas discharged from the engine.

FIG. 4 schematically shows the concentration of representative components in the exhaust gas discharged from the combustion chamber 3. As seen from FIG. 4, the concentration of the unburnt HC and CO in the exhaust gas discharged from the combustion chamber 3 is increased as the air-fuel ratio of the air-fuel mixture supplied into the combustion chamber 3 becomes rich, and the concentration of the oxygen $O_2$ discharged from the combustion chamber 3 is increased as the air-fuel ratio of the air-fuel mixture supplied into the combustion chamber 3 becomes lean.

A $NO_x$ absorbent 18 accommodated in the casing 17 uses for example alumina as the carrier. On this carrier, at least one element selected from alkali metals such as for example potassium K, sodium Na, lithium Li, and cesium Cs, alkali earth metals such as barium Ba or calcium Ca, and rare earth metals such as lanthanum La or yttrium Y and a precious metal such as platinum Pt are carried. When the ratio of the air and fuel (hydrocarbon) supplied into the engine intake passage and the exhaust passage upstream of the $NO_x$ absorbent 18 is referred to as the air-fuel ratio of the exhaust gas flowing into the $NO_x$ absorbent 18, this $NO_x$ absorbent 18 performs the action of absorbing and releasing $NO_x$ so as to absorb the $NO_x$ when the air-fuel ratio of the inflowing exhaust gas is lean and release the absorbed $NO_x$ when the oxygen concentration in the inflowing exhaust gas is lowered. Note that, where the fuel (hydrocarbon) or the air is not supplied into the exhaust passage upstream of the $NO_x$ absorbent 18, the air-fuel ratio of the flowing exhaust gas coincides with the air-fuel ratio of the air-fuel mixture supplied into the combustion chamber 3, and therefore, in this case, the $NO_x$ absorbent 18 absorbs the $NO_x$ when the air-fuel ratio of the air-fuel mixture supplied into the combustion chamber 3 is lean and releases the absorbed $NO_x$ when the oxygen concentration in the air-fuel mixture supplied into the combustion chamber 3 is lowered.

Figure 5A:
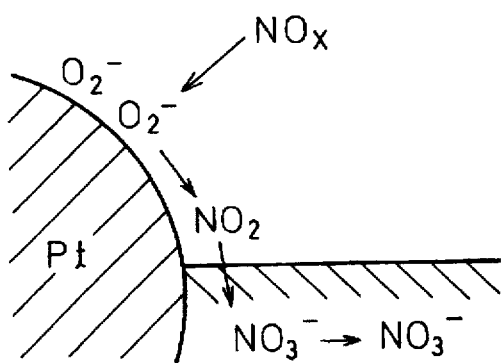
FIGS. 5A and 5B are views for explaining an absorption and releasing action of $NO_x$.
Figure 5B:
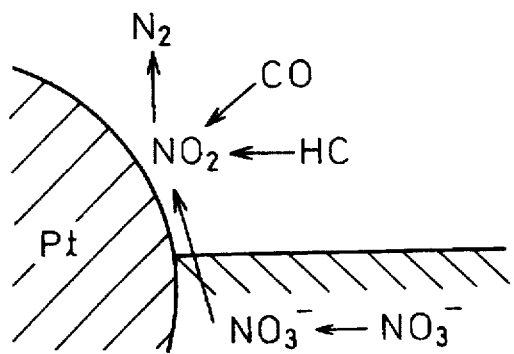

When the $NO_x$ absorbent 18 is arranged in the engine exhaust passage, this $NO_x$ absorbent 18 actually performs the absorbing and releasing action of $NO_x$, but there are areas of uncertainty regarding the detailed mechanism of this absorbing and releasing action. However, it can be considered that this absorbing and releasing action is carried out by the mechanism as shown in FIGS. 5A and 5B. Next, an explanation will be made of this mechanism by taking as an example a case where platinum Pt and barium Ba are carried on this carrier, but a similar mechanism is obtained even if an other precious metal or alkali metal, alkali earth metal, and rare earth metal are used.

Namely, when the inflowing exhaust gas becomes considerably lean, the oxygen concentration in the inflowing exhaust gas is greatly increased, and as shown in FIG. 5A, the oxygen $O_2$ is deposited on the surface of the platinum Pt in the form of $O_2^-$ or $O^{2-}$. On the other hand, the NO in the inflowing exhaust gas reacts with $O_2^-$ or $O^{2-}$ on the surface of the platinum Pt and becomes $NO_2(2NO+O_2 \rightarrow 2NO_2)$. Subsequently, one part of the generated $NO_2$ is absorbed into the absorbent while being oxidized on the platinum Pt and bonded to the barium oxide BaO while being diffused in the absorbent in the form of a nitric acid ion $NO_3^-$ as shown in FIG. 5A. In this way, $NO_x$ is absorbed into the $NO_x$ absorbent 18.

So far as the oxygen concentration in the inflowing exhaust gas is high, $NO_2$ is generated on the surface of the platinum Pt, and so far as the $NO_x$ absorbing capability of the absorbent is not saturated, the nitric acid ion $NO_3^-$ formed by absorption of $NO_2$ into the absorbent is generated. Contrary to this, when the oxygen concentration in the flowing exhaust gas is lowered and the amount of generation of the $NO_2$ is lowered, the reaction advances in a reverse direction ($NO_3^- \rightarrow NO_2$), and thus the nitric acid ion $NO_3$ in the absorbent is released from the absorbent in the form of $NO_2$. Namely, when the oxygen concentration in the flowing exhaust gas is lowered, $NO_x$ will be released from the $NO_x$ absorbent 18. As shown in FIG. 4, when the degree of leanness of the inflowing exhaust gas becomes low, the oxygen concentration in the inflowing exhaust gas is lowered, and therefore when the degree of the leanness of the inflowing exhaust gas is lowered, even if the air-fuel ratio of the inflowing exhaust gas is lean, $NO_x$ will be released from the $NO_x$ absorbent 18.

On the other hand, when the air-fuel ratio of the air-fuel mixture supplied into the combustion chamber 3 is made rich and the air-fuel ratio of the inflowing exhaust gas becomes rich, as shown in FIG. 4, a large amount of unburnt HC and CO are discharged from the engine. These unburnt HC and CO react with the oxygen $O_2^-$ or $O^{2-}$ on the platinum Pt and are oxidized. Further, when the air-fuel ratio of the inflowing exhaust gas becomes rich, the oxygen concentration in the inflowing exhaust gas is extremely lowered, so $NO_2$ is released from the absorbent. This $NO_2$ reacts with the unburnt HC and CO and is reduced as shown in FIG. 5B. In this way, when $NO_2$ no longer exists on the surface of the platinum Pt, the $NO_2$ is successively released from the absorbent. Accordingly, when the air-fuel ratio of the inflowing exhaust gas is made rich, the $NO_x$ will be released from the $NO_x$ absorbent 18 in a short time.

Namely, when the air-fuel ratio of the inflowing exhaust gas is made rich, first of all, the unburnt HC and CO immediately react with $O_2^-$ or $O^{2-}$ on the platinum Pt and are oxidized, and then even if the $O_2^-$ or $O^{2-}$ on the platinum Pt is consumed, if the unburnt HC and CO still remain, the $NO_x$ released from the absorbent and the $NO_x$ discharged from the engine are reduced. Accordingly, if the air-fuel ratio of the inflowing exhaust gas is made rich, the $NO_x$ absorbed in the $NO_x$ absorbent 18 is released in a short time, and, in addition, this released $NO_x$ is reduced, so it becomes possible to prevent the $NO_x$ from being discharged into the atmosphere.

As mentioned above, when the lean air-fuel mixture is burned, $NO_x$ is absorbed into the $NO_x$ absorbent 18. However, there is a limit to the $NO_x$ absorbing ability of the $NO_x$ absorbent 18. When the $NO_x$ absorbing capability of the $NO_x$ absorbent 18 is saturated, the $NO_x$ absorbent 18 no longer can absorb the $NO_x$. Accordingly, it is necessary to release the $NO_x$ from the $NO_x$ absorbent 18 before the $NO_x$ absorbing capability of the $NO_x$ absorbent 18 is saturated. For this purpose, it is necessary to estimate to what degree the $NO_x$ has been absorbed in the $NO_x$ absorbent 18. Next, an explanation will be made of the estimation method of this amount of absorption of $NO_x$.

Figure 6A:
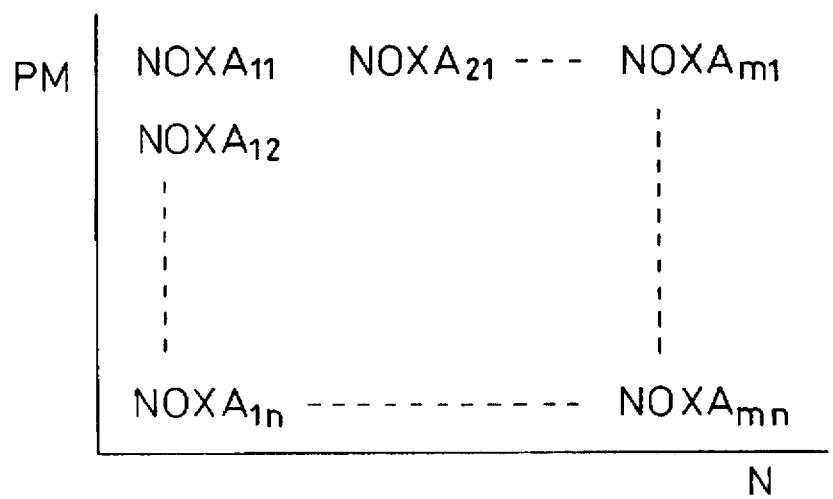
FIGS. 6A and 6B are views showing an amount NOXA of $NO_x$ absorbed and an amount NOXD of $NO_x$ released.

When the lean air-fuel mixture is burned, the higher the engine load, the larger the amount of $NO_x$ discharged from the engine per unit time, so the amount of $NO_x$ absorbed into the $NO_x$ absorbent 18 per unit time is increased. Also, the higher the engine speed, the larger the amount of $NO_x$ discharged from the engine per unit time, so the amount of $NO_x$ absorbed into the $NO_x$ absorbent 18 per unit time is increased. Accordingly, the amount of $NO_x$ absorbed into the $NO_x$ absorbent 18 per unit time becomes a function of the engine load and the engine speed. In this case, the engine load can be represented by the absolute pressure in the surge tank 10, so the amount of $NO_x$ absorbed into the $NO_x$ absorbent 18 per unit time becomes a function of the absolute pressure PM in the surge tank 10 and the engine speed N. Accordingly, in the embodiment according to the present invention, the amount of $NO_x$ absorbed into the $NO_x$ absorbent 18 per unit time is found in advance as a function of the absolute pressure PM and the engine speed N by experiments. These amounts NOXA and PM of absorption of $NO_x$ are stored in advance in the ROM 32 in the form of a map shown in FIG. 6 as a function of PM and N.

On the other hand, as mentioned before, during the period where the $NO_x$ is released from the $NO_x$ absorbent 18, the unburnt HC and CO contained in the exhaust gas, that is, the excess fuel, is used for reducing the $NO_x$ released from the $NO_x$ absorbent 18, therefore the amount NOXD of $NO_x$ released from the $NO_x$ absorbent 18 per unit time becomes proportional to the amount of excess fuel supplied per unit time. Note that the amount $Q_{ex}$ of excess fuel supplied per unit time can be represented by the following equation:

$$Q_{ex} = f_1 \cdot (K-1.0) \cdot TP \cdot N$$

Here, $f_1$ indicates a proportional constant, K a correction coefficient, TP a basic fuel injection time, and N, an engine speed. On the other hand, when the proportional constant is $f_2$, the amount NOXD of $NO_x$ released from the $NO_x$ absorbent 18 per unit time can be represented by $$NOXD = f_2 \cdot Q_{ex}$$

so if $f = f_1 \cdot f_2$, the amount NOXD of $NO_x$ released from the $NO_x$ absorbent 18 per unit time can be represented by the following equation:

$$NOXD = f \cdot (K-1.0) \cdot TP \cdot N$$

Figure 6B:
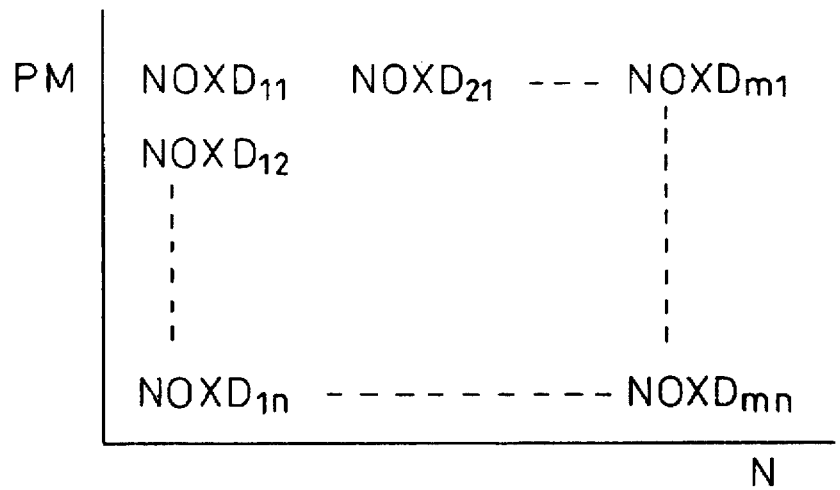

On the other hand, as mentioned before, even when the air-fuel ratio of the air-fuel mixture is maintained at the stoichiometric air-fuel ratio, the action of releasing $NO_x$ from the $NO_x$ absorbent 18 is carried out. At this time, the amount NOXD of $NO_x$ released from the $NO_x$ absorbent 18 per unit time becomes a function of the absolute pressure PM in the surge tank 10 and the engine rotation speed N, and this amount NOXD of $NO_x$ released is preliminarily stored in the ROM 32 in the form of a map as shown in FIG. 6B.

Further, when the temperature of the $NO_x$ absorbent 18 becomes high, the nitric acid ions $NO_3^-$ diffused in the absorbent decompose, and the $NO_x$ is naturally released from the $NO_x$ absorbent 18. At this time, the amount NOXD' of $NO_x$ released from the $NO_x$ absorbent 18 per unit time is represented by the following equation:

$$NOXD' = f(TE) \cdot NOXD''$$

Figure 7A:
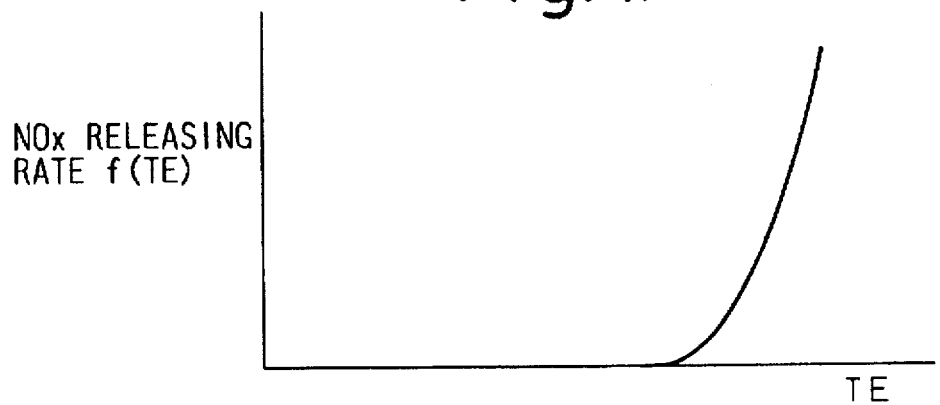
FIGS. 7A, 7B, and 7C are views showing a natural amount of release of $NO_x$.
Figure 7B:
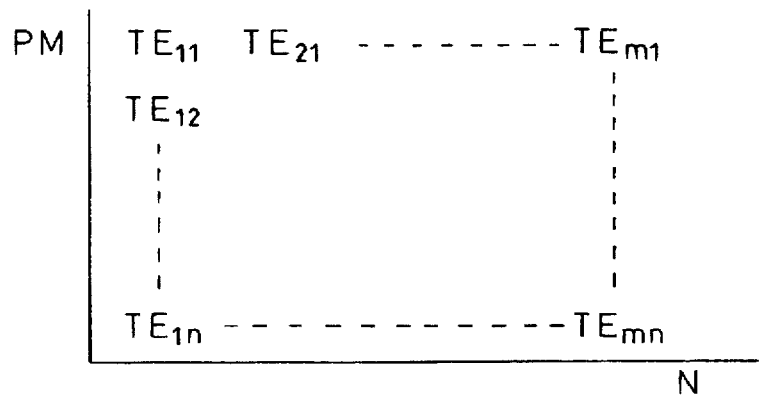
Figure 7C:
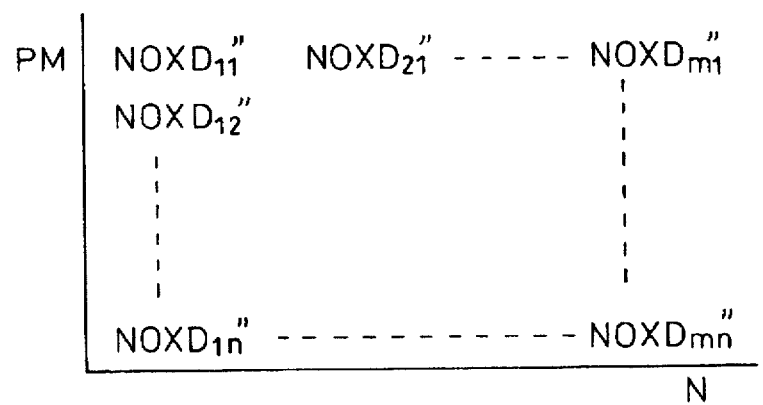

Here, f(TE) shows the rate of $NO_x$ release and NOXD" shows the basic amount of $NO_x$ released. The rate of $NO_x$ released f(TE) abruptly becomes large when the exhaust gas temperature TE representative of the temperature of the $NO_x$ absorbent 18 exceeds a predetermined temperature as shown in FIG. 7A. Note that, in the embodiment according to the present invention, the exhaust gas temperature TE is preliminarily stored in the ROM 32 as a function of the absolute pressure PM in the surge tank 10 and the engine rotation speed N in the form of a map as shown in FIG. 7B. Further, also the basic amount NOXD" of $NO_x$ released is preliminarily stored in the ROM 32 as a function of the absolute pressure PM in the surge tank 10 and the engine rotation speed N in the form of a map as shown in FIG. 7C.

As mentioned above, when a lean air-fuel mixture is burned, the amount of $NO_x$ absorbed per unit time is represented by NOXA, and when the stoichiometric air-fuel ratio or a rich air-fuel mixture is burned, the amount of $NO_x$ released per unit time is represented by NOXD. The natural amount of $NO_x$ released per unit time when the temperature of the $NO_x$ absorbent 18 becomes high is represented by NOXD' so the amount $\Sigma NOX$ of $NO_x$ estimated to be absorbed in the $NO_x$ absorbent 18 is represented by the following equation:

$$\Sigma NOX = \Sigma NOX + NOXA - NOXD - NOXD'$$

Figure 8:
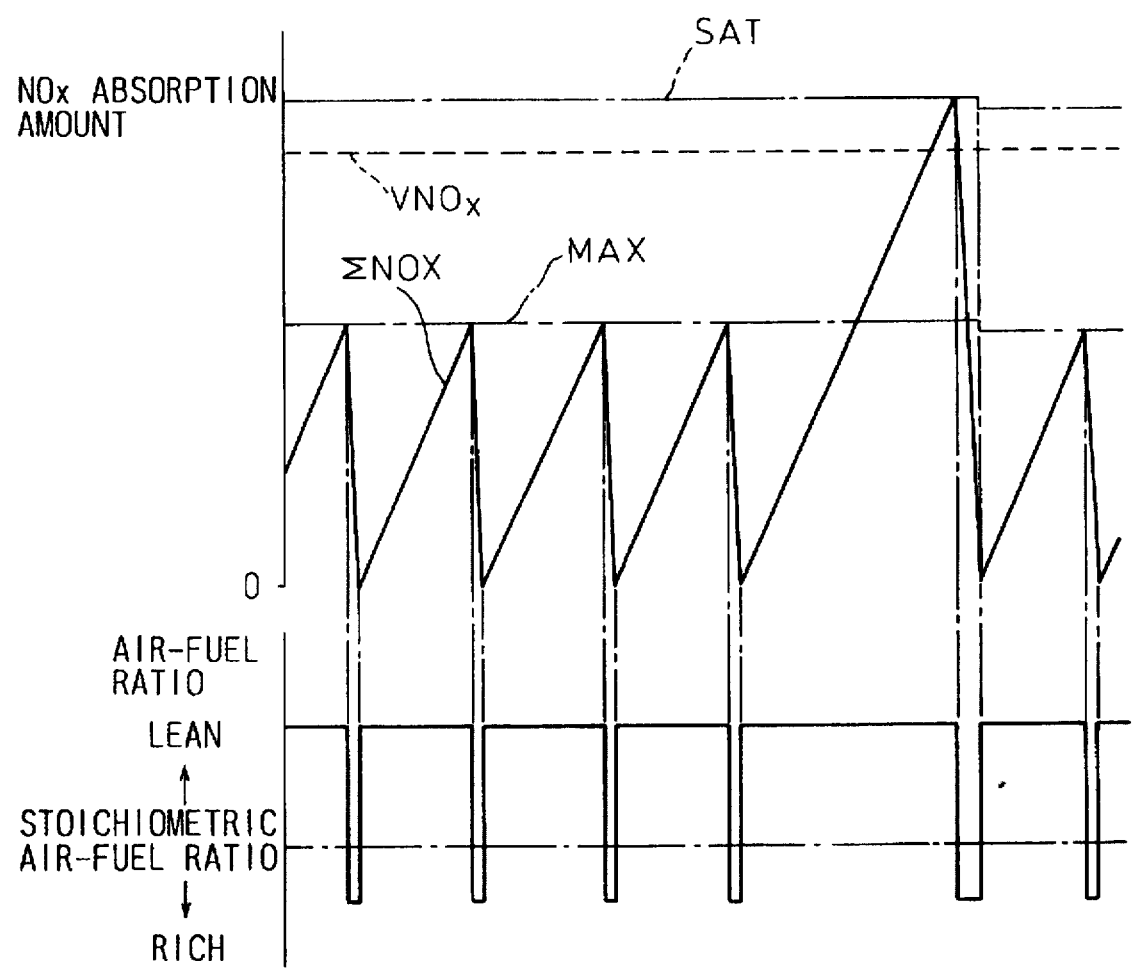
FIG. 8 is a time chart of the air-fuel ratio control.

Therefore, in the embodiment according to the present invention, as shown in FIG. 8, when the amount $\Sigma NOX$ of the $NO_x$ estimated to be absorbed in the $NO_x$ absorbent 18, in practice, the corrected amount of estimation of $NO_x$ $\Sigma NKX$ mentioned later, reaches the allowable maximum value MAX, the air-fuel ratio of the air-fuel mixture is temporarily made rich, whereby $NO_x$ is released from the $NO_x$ absorbent 18.

However, $SO_x$ is contained in the exhaust gas, and not only $NO_x$, but also $SO_x$ are absorbed into the $NO_x$ absorbent 18. The absorbing mechanism of $SO_x$ to the $NO_x$ absorbent 18 can be considered to be the same as the absorption mechanism of $NO_x$.

Namely, similar to the explanation of the absorbing mechanism of $NO_x$, when the explanation is made by taking as an example a case where platinum Pt and barium Ba are carried on the carrier, as mentioned before, when the air-fuel ratio of the inflowing exhaust gas is lean, the oxygen $O_2$ is deposited on the surface of the platinum Pt in the form of $O_2^-$ or $O^{2-}$, and the $SO_2$ in the inflowing exhaust gas reacts with the $O_2^-$ or $O^{2-}$ on the surface of the platinum Pt and becomes $SO_3$. Subsequently, one part of the generated $SO_3$ is absorbed into the absorbent while being further oxidized on the platinum Pt and bonded to the barium oxide BaO while being diffused in the absorbent in the form of a sulfuric acid ion $SO_4^{2-}$ and stable sulfate $BaSO_4$ is generated.

However, this sulfate $BaSO_4$ is stable and hard to decompose. Even if the air-fuel ratio of the air-fuel mixture is made rich for just a short time as shown in FIG. 8, most of the sulfate $BaSO_4$ is not decomposed and remains as it is. Accordingly, the sulfate $BaSO_4$ is increased in the $NO_x$ absorbent 18 along with the elapse of time, and thus the maximum amount of absorption of $NO_x$ which can be absorbed by the $NO_x$ absorbent 18 will be gradually lowered along with the elapse of time. Namely, in other words, the $NO_x$ absorbent 18 will gradually deteriorate along with the elapse of time. When the maximum amount of absorption of $NO_x$ by the $NO_x$ absorbent 18 is lowered, it is necessary to release the $NO_x$ from the $NO_x$ absorbent 18 in a period when the amount of absorption of the $NO_x$ in the $NO_x$ absorbent 18 is small. For this purpose, first, it becomes necessary to correctly detect the maximum amount of absorption of $NO_x$ possible by the $NO_x$ absorbent 18, that is, the degree of deterioration of the $NO_x$ absorbent 18.

In the embodiment according to the present invention, the maximum amount of absorption of $NO_x$ possible by the $NO_x$ absorbent 18, that is, the degree of deterioration of the $NO_x$ absorbent 18, is detected from the air-fuel ratio detected by the $O_2^-$ sensor 22. This will be explained later.

Namely, when the air-fuel ratio of the air-fuel mixture supplied into the combustion chamber 3 becomes rich, as shown in FIG. 4, the exhaust gas containing the oxygen $O_2$ and the unburnt HC and CO is discharged from the combustion chamber 3, but this oxygen $O_2$ and the unburnt HC and CO do not react much at all with each other, and thus this oxygen $O_2$ passes through the $NO_x$ absorbent 18 and is discharged from the $NO_x$ absorbent 18. On the other hand, when the air-fuel ratio of the air-fuel mixture supplied into the combustion chamber 3 becomes rich, $NO_x$ is released from the $NO_x$ absorbent 18. At this time, the unburnt HC and CO contained in the exhaust gas is used for reducing the released $NO_x$, so during a period when the $NO_x$ is released from the $NO_x$ absorbent 18, no unburnt HC and CO are discharged from the $NO_x$ absorbent 18. Accordingly, during a period when the $NO_x$ is continuously released from the $NO_x$ absorbent 18, the oxygen $O_2$ is contained in the exhaust gas discharged from the $NO_x$ absorbent 18, but no unburnt HC and CO are contained, therefore during this term, the air-fuel ratio of the exhaust gas discharged from the $NO_x$ absorbent 18 becomes slightly lean.

Subsequently, when all of the $NO_x$ absorbed in the $NO_x$ absorbent 18 is released, the unburnt HC and CO contained in the exhaust gas are not used for the reduction of the $O_2$ in the $NO_x$ absorbent 18 but are discharged as they are from the $NO_x$ absorbent 18. Accordingly, the air-fuel ratio of the exhaust gas discharged from the $NO_x$ absorbent 18 becomes rich at this time. Namely, when all of the $NO_x$ absorbed in the $NO_x$ absorbent 18 is released, the air-fuel ratio of the exhaust gas discharged from the $NO_x$ absorbent 18 changes from lean to rich. Accordingly, all of the $NO_x$ absorbed in the $NO_x$ absorbent 18 is released from the $NO_x$ absorbent 18 during the time elapsing from when the air-fuel ratio of the exhaust gas flowing into the $NO_x$ absorbent 18 is changed from lean to rich to when the air-fuel ratio of the exhaust gas discharged from the $NO_x$ absorbent 18 becomes rich. Therefore, from this, the amount of $NO_x$ absorbed in the $NO_x$ absorbent 18 is seen. This will be explained in slightly detail more next.

Figure 9:
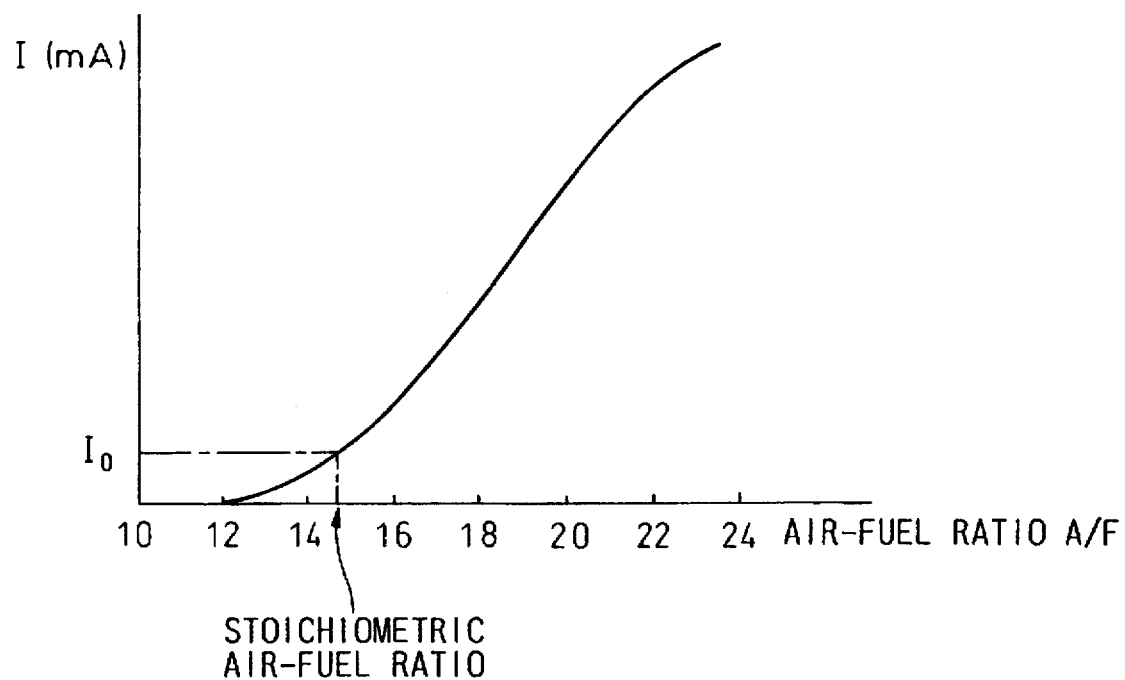
FIG. 9 is a view showing a value of a current flowing between an anode and a cathode of the $O_2$ sensor.
Figure 10:
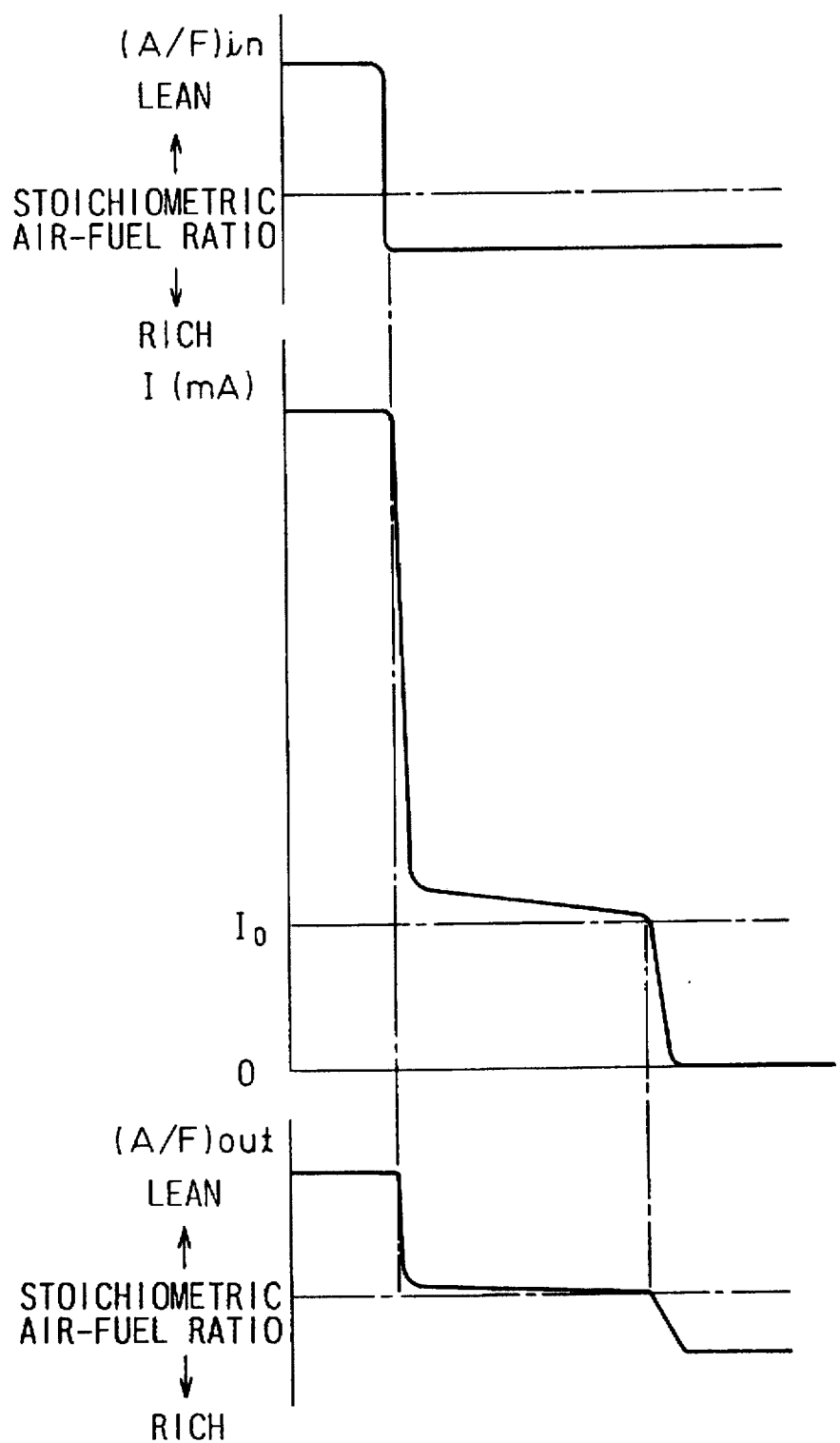
FIG. 10 is a time chart showing a change of the value of current flowing between the anode and cathode of the $O_2$ sensor.

The $O_2$ sensor 22 shown in FIG. 1 comprises a cup-like cylindrical body made of zirconia arranged in the exhaust passage. An anode made of a thin platinum film is formed on an inside surface of this cylindrical body and a cathode made of a thin platinum film is formed on an outside surface of this cylindrical body, respectively. The cathode is covered by a porous layer. Constant voltage is applied between the cathode and anode. In this $O_2$ sensor 22, as shown in FIG. 9, a current I (mA) proportional to the air-fuel ratio A/F flows between the cathode and anode. Note that, in FIG. 9, $I_0$ indicates the current when the air-fuel ratio A/F is the stoichiometric air-fuel ratio (=14.6). As seen from FIG. 9, when the air-fuel ratio A/F is lean, the current I is increased as the air-fuel ratio A/F becomes larger within a range where $I > I_0$, and the current I becomes zero when the air-fuel ratio A/F becomes rich of almost 13.0 or less. FIG. 10 shows the change of the air-fuel ratio (A/F) in of the exhaust gas flowing into the $NO_x$ absorbent 18, the change of the current I flowing between the cathode and anode of the $O_2$ sensor 22, and the change of the air-fuel ratio (A/F) of the exhaust gas flowing out from the $NO_x$ absorbent 18. As shown in FIG. 10, when the air-fuel ratio (A/F) of the exhaust gas flowing into the $NO_x$ absorbent 18 is changed from lean to rich and the $NO_x$ releasing action from the $NO_x$ absorbent 18 is started, the air-fuel ratio (A/F) out of the exhaust gas flowing out from the $NO_x$ absorbent 18 abruptly becomes small to near the stoichiometric air-fuel ratio, and therefore the current I is abruptly decreased to near $I_0$. Subsequently, in a term when the $NO_x$ releasing action from the $NO_x$ absorbent 18 is carried out, the air-fuel ratio (A/F) out of the exhaust gas flowing out from the $NO_x$ absorbent 18 is held in a slightly lean state, and therefore the current I is held at a value slightly larger than the $I_0$. Subsequently, when all of the $NO_x$ absorbed in the $NO_x$ absorbent 18 is released, the air-fuel ratio (A/F) of the exhaust gas flowing out from the $NO_x$ absorbent 18 abruptly becomes small and becomes rich, and therefore the current I abruptly falls to zero.

Figure 11:
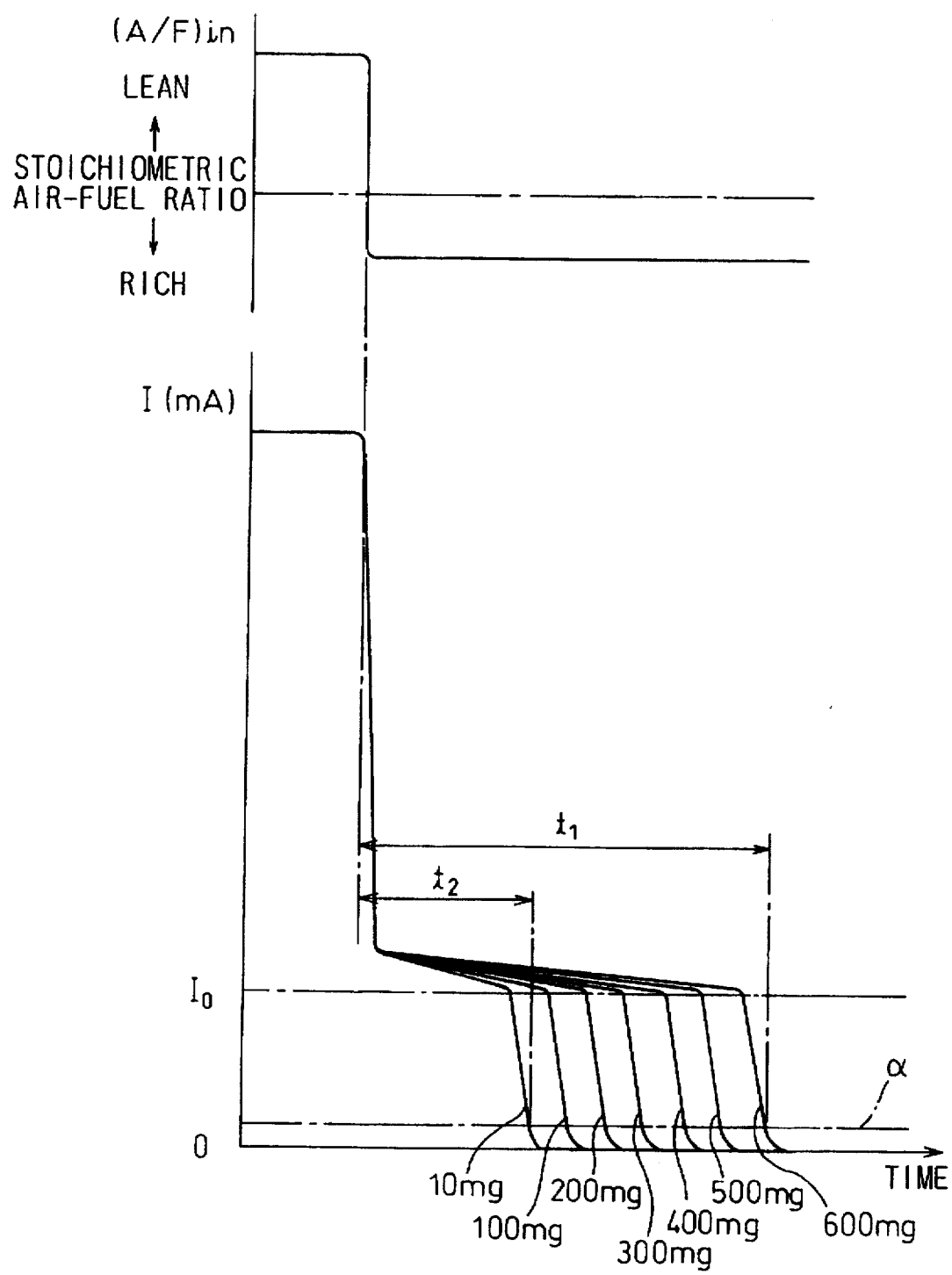
FIG. 11 is a time chart showing a change of the value of current flowing between the anode and cathode of the $O_2$ sensor.

FIG. 11 shows the change of the current I where the amount of $NO_x$ contained in the $NO_x$ absorbent 18 differs. Note that, in FIG. 11, the numerical values indicate the amount of $NO_x$ absorbed in the $NO_x$ absorbent 18. As shown in FIG. 11, when the amount of $NO_x$ absorbed in the $NO_x$ absorbent 18 is different, along with this, an elapsed time $t_1$ from when the air-fuel ratio (A/F) in of the exhaust gas flowing into the $NO_x$ absorbent 18 is changed from lean to rich to when the current I becomes almost zero changes. The smaller the amount of $NO_x$ absorbed in the $NO_x$ absorbent 18, the shorter this elapsed time $t_1$. $NO_x$ is continuously released from the $NO_x$ absorbent 18 for almost this elapsed time $t_1$. If the entire amount of $NO_x$ released during this elapsed time $t_1$ is found, the entire amount of $NO_x$ absorbed in the $NO_x$ absorbent 18 will be seen.

As mentioned before, however, the amount NOXD of $NO_x$ released from the $NO_x$ absorbent 18 per unit time is proportional to the excess amount of fuel supplied per unit time and this NOXD is represented by the following equation:

$$NOXD = f \cdot (K-1.0) \cdot TP \cdot N$$

Accordingly, if the sum of the amount of supply of excess fuel during the elapsed time $t_1$ that is, the sum of the amount NOXD of $NO_x$ released is found, the entire amount of $NO_x$ absorbed in the $NO_x$ absorbent 18 can be detected.

However, since the $NO_x$ absorbent 18 has an $O_2$ storage function in addition to the absorbing and releasing function of $NO_x$, there is a problem that even if the sum of the amount of supply of excess fuel during the elapsed time $t_1$ is found, the entire amount of the $NO_x$ actually absorbed in the $NO_x$ absorbent 18 cannot be detected. An explanation will be made next of this.

Namely, in the $NO_x$ absorbent 18 as well, when the air-fuel ratio of the exhaust gas flowing into the $NO_x$ absorbent 18 becomes lean, the oxygen in the exhaust gas is attracted and stored by the $NO_x$ absorbent 18. Subsequently, when the air-fuel ratio of the exhaust gas flowing into the $NO_x$ absorbent 18 becomes rich, the stored oxygen is used for oxidizing the unburnt HC and CO etc. and thus the stored oxygen is released from the $NO_x$ absorbent 18. The $O_2$ storage function of this $NO_x$ absorbent 18 becomes particularly conspicuous where cerium Ce is carried on the carrier.

However, as mentioned above, the oxygen released from the $NO_x$ absorbent 18 is used for oxidizing the unburnt HC, CO, etc. contained in the exhaust gas, that is, the excess fuel, therefore the amount of oxygen released from the $NO_x$ absorbent 18 per unit time becomes proportional to the amount of excess fuel supplied per unit time. Accordingly, when the correction coefficient f used for the amount NOXD of $NO_x$ released is used for comparing the amount of excess fuel necessary for releasing $NO_x$ from the $NO_x$ absorbent 18 and the amount of excess fuel for releasing the oxygen from the $NO_x$ absorbent 18, the amount of oxygen released from the $NO_x$ absorbent 18 per unit time becomes proportional to the OD represented by the following equation:

$$OD = f \cdot (K-1.0) \cdot TP \cdot N$$

Note that, below, this OD will be referred to as the amount of oxygen released from the $NO_x$ absorbent 18 per unit time.

During the period where the oxygen is released from the $NO_x$ absorbent 18, similar to the period where $NO_x$ is released from the $NO_x$ absorbent 18, the air-fuel ratio of the exhaust gas flowing out from the $NO_x$ absorbent 18 is maintained slightly lean. As shown in FIG. 11, when the amount of absorption of $NO_x$ of the $NO_x$ absorbent 18 is 10 mg, that is, when the amount of $NO_x$ absorption of the $NO_x$ absorbent 18 is almost zero, after the time $t_2$ elapses after the air-fuel ratio (A/F) of the air-fuel mixture is changed from lean to rich, the current value I becomes smaller than α. At this time, the action of releasing $NO_x$ is not carried out, and only the action of releasing oxygen is carried out. Accordingly if the sum of the amount of supply of the excess fuel during the elapsed time $t_2$, that is, the sum ΣOD of the amount OD of oxygen release, is found, the entire amount of oxygen actually stored in the $NO_x$ absorbent 18 can be detected.

Namely, the excess fuel supplied during the elapsed time $t_1$ in FIG. 11 is used for releasing the $NO_x$ and oxygen from the $NO_x$ absorbent 18. Accordingly, the amount of $NO_x$ absorbed in the $NO_x$ absorbent 18 and the amount of oxygen absorbed and stored therein cannot be seen from the amount of excess fuel supplied during this elapsed time $t_1$. When the amount of $NO_x$ absorbed in the $NO_x$ absorbent 18 is almost zero, however, the amount of oxygen absorbed and stored in the $NO_x$ absorbent 18 is seen from the amount of excess fuel supplied during the elapsed time $t_2$. Therefore, in the embodiment according to the present invention, the absorbed and stored oxygen amount ΣOD is found first, and then the sum of the amount of absorption of $NO_x$ and the amount of absorbed and stored oxygen is found from the amount of supply of the excess fuel during the elapsed time $t_1$, then the amount ΣOD of absorbed and stored oxygen is subtracted from this sum to find the amount of $NO_x$ absorption.

In this way, in the embodiment according to the present invention, first, the amount of absorbed and stored oxygen is found. Accordingly, where the $NO_x$ is absorbed in the $NO_x$ absorbent 18, if for example a lean air-fuel mixture is burned, first, the air-fuel ratio of the air-fuel mixture is changed from lean to rich and all of the absorbed $NO_x$ and all of the stored oxygen are released from the $NO_x$ absorbent 18. Subsequently, until the air-fuel ratio of the air-fuel mixture is changed from rich to lean and the $NO_x$ absorbent 18 stores all the oxygen which can be absorbed, the air-fuel ratio of the air-fuel mixture is maintained lean. The time until the $NO_x$ absorbent 18 stores all of the oxygen which can be absorbed is extremely short. During this time, almost no $NO_x$ is absorbed into the $NO_x$ absorbent 18. Subsequently, the air-fuel ratio of the air-fuel mixture is changed from lean to rich again. At this time, the amount of absorption of $NO_x$ of the $NO_x$ absorbent 18 is almost zero, and accordingly the amount of absorbed and stored oxygen is calculated from the sum of the amount of supply of the excess fuel, that is, the sum of the amount OD of absorbed and stored oxygen during the elapsed time $t_2$ at this time.

On the other hand, even if operating with a lean air-fuel mixture, when engine high speed operation in which the temperature of the $NO_x$ absorbent 18 becomes high is continued, all of the absorbed $NO_x$ is naturally released from the $NO_x$ absorbent 18 during this time. Accordingly, in such a case, the air-fuel ratio of the air-fuel mixture is merely changed from lean to rich, and the amount of absorbed and stored oxygen is calculated from the sum of the amount of supply of the excess fuel during this elapsed time $t_2$.

Further, when an air-fuel mixture of the stoichiometric air-fuel ratio is burned over a predetermined period, all of the absorbed $NO_x$ is released from the $NO_x$ absorbent 18 during this time. Accordingly, in this case, first, the air-fuel ratio of the air-fuel mixture is changed from the stoichiometric air-fuel ratio to lean, the oxygen which can be stored in the $NO_x$ absorbent 18 is stored, then the air-fuel ratio of the air-fuel mixture is changed from lean to rich, and the amount of absorbed and stored oxygen is calculated from the sum of the amount of supply of the excess fuel during this elapsed time $t_2$.

In this way, the amount of oxygen which can be stored in the $NO_x$ absorbent 18 is calculated and this amount of oxygen is used to find the degree of deterioration of the $NO_x$ absorbent 18 due to the lowering of the $O_2$ storage function. The detection of the amount of oxygen which can be stored by the $NO_x$ absorbent 18 is carried out at a considerably lower frequency compared with the action of release of $NO_x$ from the $NO_x$ absorbent 18. Further, the detection of the maximum absorption amount of $NO_x$ of the $NO_x$ absorbent 18 is carried out at a higher frequency than that of the detection of the amount of oxygen which can be stored in the $NO_x$ absorbent 18. At the time of detection of the maximum amount of $NO_x$ absorption of the $NO_x$ absorbent 18, first, the sum of the amount of $NO_x$ absorption and the amount of stored oxygen is found from the amount of supply of the excess fuel during the elapsed time $t_1$ when the air-fuel ratio of the air-fuel mixture is changed from lean to rich. By subtracting the already detected amount of oxygen which can be stored from this sum, the maximum amount of $NO_x$ absorption is calculated.

However, to calculate the maximum amount of $NO_x$ absorption by the $NO_x$ absorbent 18, that is, so as to detect the degree of deterioration in the absorption capability of $NO_x$ of the $NO_x$ absorbent 18, at the time of detection, the amount ΣNOX of $NO_x$ absorption of the $NO_x$ absorbent 18 must become the maximum amount of $NO_x$ absorption. Namely, when assuming that the $VNO_x$ indicated by the broken line in FIG. 8 is the maximum amount of absorption of $NO_x$ which is actually possible, when the amount ΣNOX of absorption of $NO_x$ of the $NO_x$ absorbent 18 is smaller than this $VNO_x$, even if all of the $NO_x$ is released from the $NO_x$ absorbent 18, the maximum amount $VNO_x$ of absorption of $NO_x$ cannot be found. This is because the entire amount of $NO_x$ released at this time is smaller than the maximum amount of absorption of $NO_x$.

Contrary to this, when the $NO_x$ is released from the $NO_x$ absorbent 18 when the absorbing capability of the $NO_x$ absorbent 18 is saturated, the entire amount of $NO_x$ released at this time represents the maximum amount $VNO_x$ of absorption of $NO_x$. Therefore, in the embodiment according to the present invention, a decision level SAT which is slightly larger than the value near the maximum amount $VNO_x$ of absorption of $NO_x$ at present is set, and as shown in FIG. 8. When the amount ΣNOX of absorption of $NO_x$ of the $NO_x$ absorbent 18 reaches this decision level SAT, the entire $NO_x$ is released from the $NO_x$ absorbent 18, whereby the actual amount $VNO_x$ of absorption of $NO_x$, that is, the degree of deterioration of the $NO_x$ absorbent 18 at this time, is found.

Note that, as shown in FIG. 8, the allowable maximum value MAX with respect to the amount ΣNOX of $NO_x$ is set to a value smaller than the maximum amount $VNO_x$ of absorption of $NO_x$, and when the ΣNOX reaches the allowable maximum value MAX, the decision of deterioration of the $NO_x$ absorbent 18 is not carried out, and only the action of releasing $NO_x$ from the $NO_x$ absorbent 18 is carried out.

The frequency of only the action of releasing the $NO_x$ from the $NO_x$ absorbent 18 being carried out is higher than the frequency of the decision of deterioration of the $NO_x$ absorbent 18 being carried out, and therefore for a period after the decision of deterioration of the $NO_x$ absorbent 18 is carried out and until the next decision of deterioration of the $NO_x$ absorbent 18 is carried out, a number of actions of releasing $NO_x$ are carried out.

The amount of absorption $\Sigma NOX$ of $NO_x$ of the $NO_x$ absorbent 18 is, however, an estimated amount as mentioned before, and therefore this amount $\Sigma NOX$ of absorption of $NO_x$ does not always represent the actual amount of absorption of $NO_x$. In this case, if for example the amount $\Sigma NOX$ of absorption of $NO_x$ indicates a considerably higher value than the actual amount of absorption of $NO_x$, even if the amount $\Sigma NOX$ of absorption of $NO_x$ reaches the decision level SAT, the actual amount of absorption of $NO_x$ does-not reach the actual maximum amount $VNO_x$ of absorption of $NO_x$, and thus there arises a problem in that the actual maximum amount $VNO_x$ of absorption of $NO_x$ cannot be correctly detected.

Therefore, in the embodiment according to the present invention, a correction value KX with respect to the amount $\Sigma NOX$ of absorption of $NO_x$ is introduced. Whenever the amount $\Sigma NOX$ of absorption of $NO_x$ reaches the allowable maximum value MAX and the release of $NO_x$ from the $NO_x$ absorbent 18 is carried out, the actual amount $XNO_x$ of absorption of $NO_x$ is calculated on the basis of the output signal of the $NO_x$ sensor 22, and the correction value KX is updated on the basis of the following equation:

$$KX = KX \cdot (XNO_x/\Sigma NOX)$$

In this case, the corrected estimated amount of $NO_x$ is represented by $\Sigma NKX$ $(=KX \cdot \Sigma NOX)$. Namely, where for example the estimated amount $\Sigma NOX$ of absorption of $NO_x$ becomes smaller than the actual amount $XNO_x$ of absorption of $NO_x$, the value of the correction value KX is increased with respect to the value of the correction value KX which has been used heretofore so that $\Sigma NKX$ $(=KX \cdot \Sigma NOX)$ coincides with $XNO_x$. Accordingly, in the embodiment according to the present invention, in actuality, not when the estimated amount $\Sigma NOX$ of $NO_x$ reaches MAX, but when the corrected estimated amount $\Sigma NOX$ of $NO_x$ reaches the allowable maximum value MAX, the action of releasing $NO_x$ is carried out.

As mentioned above, in the embodiment according to the present invention, the actual amounts $VNO_x$ and $XNO_x$ of $NO_x$ are calculated on the basis of the current I flowing between the cathode and anode of the $O_2$ sensor 22 and the air-fuel ratio is controlled for releasing $NO_x$ on the basis of these values $VNO_x$ and $XNO_x$. In this case, the current I flowing between the cathode and anode of the $O_2$ sensor 22 is converted to a voltage and input into the input port 36. In the electronic control unit 30, this voltage is converted to the corresponding current I again and the air-fuel ratio is controlled on the basis of the current value I.

Next, an explanation will be made of the detection of deterioration of the $NO_x$ absorbent 18 referring to FIG. 12 to FIG. 24.

Figure 12:
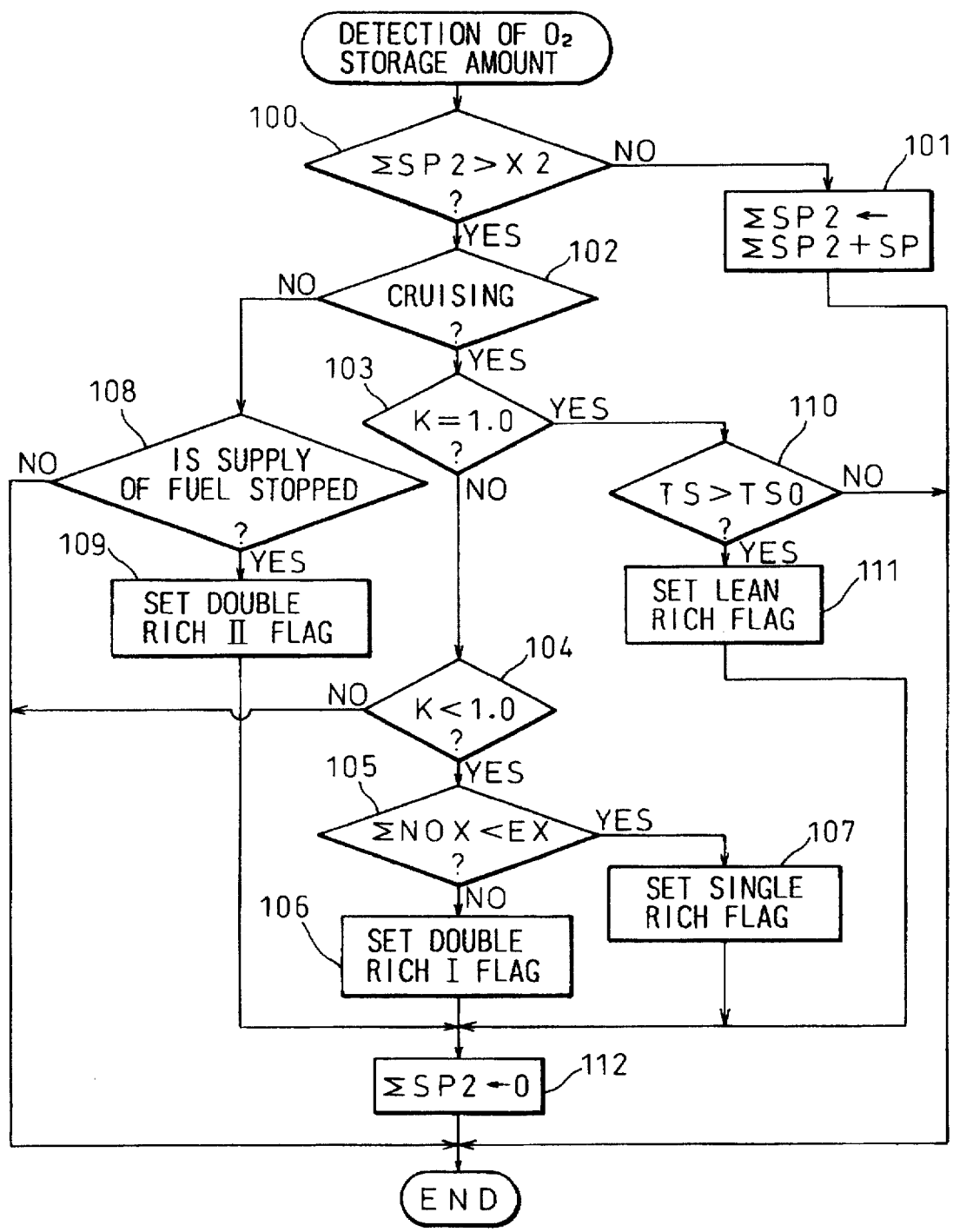
FIG. 12 is a flow chart of the detection of the amount of $O_2$ storage.

FIG. 12 shows a routine of detection of the $O_2$ storage amount, which routine is executed by interruption at every predetermined time interval.

Referring to FIG. 12, first, it is determined whether or not the cumulative traveling distance $\Sigma SP2$ of vehicle has become larger than the set value X2. When $\Sigma SP \leq X2$, the processing routine proceeds to step 101, at which the current vehicle speed SP is added to the cumulative traveling distance $\Sigma SP2$. On the other hand, when $\Sigma SP2 > X2$, the processing routine proceeds to step 102, at which it is determined whether or not the engine is in the cruising state in which an acceleration or deceleration operation is not carried out. At the time of cruising, the processing routine proceeds to step 103, at which it is determined whether or not the correction coefficient K is 1.0. When K is not equal to 1.0, that is, when the air-fuel ratio of the air-fuel mixture is not the stoichiometric air-fuel ratio, the processing routine proceeds to step 104, at which it is determined whether or not the correction coefficient K is smaller than 1.0. When $K \geq 1.0$, that is, when a rich air-fuel mixture is burned, the processing cycle is completed. Contrary to this, when $K < 1.0$, that is, when a lean air-fuel mixture is burned, it is determined whether or not the estimated amount $\Sigma NOX$ of $NO_x$ is smaller than an extremely small amount EX. When $\Sigma NOX \geq EX$, that is, when it is estimated that the $NO_x$ is absorbed in the $NO_x$ absorbent 18, the processing routine proceeds to step 106, at which a double rich I flag is set. Subsequently, at step 112, $\Sigma SP2$ is made zero.

On the other hand, when it is determined at step 105 that $\Sigma NOX < EX$, that is, when it is estimated that the amount of absorption of $NO_x$ in the $NO_x$ absorbent 18 is almost zero, the processing routine proceeds to step 107, at which a single rich flag is set. Subsequently, the processing routine proceeds to step 112.

Further, when it is determined at step 102 that the operating state is not cruising, the processing routine proceeds to step 108, at which it is determined whether or not action has been taken to stop the supply of fuel in a deceleration operation. When no action is taken to stop the supply of fuel, the processing cycle is completed. Contrary to this, when action is taken to stop the supply of fuel, the processing routine proceeds to step 109, at which the double rich flag II is set. Subsequently, the processing routine proceeds to step 112.

On the other hand, when it is determined at step 103 that $K=1.0$, that is, when the air-fuel ratio of the air-fuel mixture is made the stoichiometric air-fuel ratio, the processing routine proceeds to step 110, at which it is determined whether or not the count TS indicating the time during which the air-fuel ratio is maintained at the stoichiometric air-fuel ratio is larger than the set value $TS_0$. When $TS \leq TS_0$, the processing cycle is completed. Contrary to this, when TS becomes larger than $TS_0$, the processing routine proceeds to step 111, at which a lean rich flag is set. Subsequently, the processing routine proceeds to step 112.&

Figure 13:
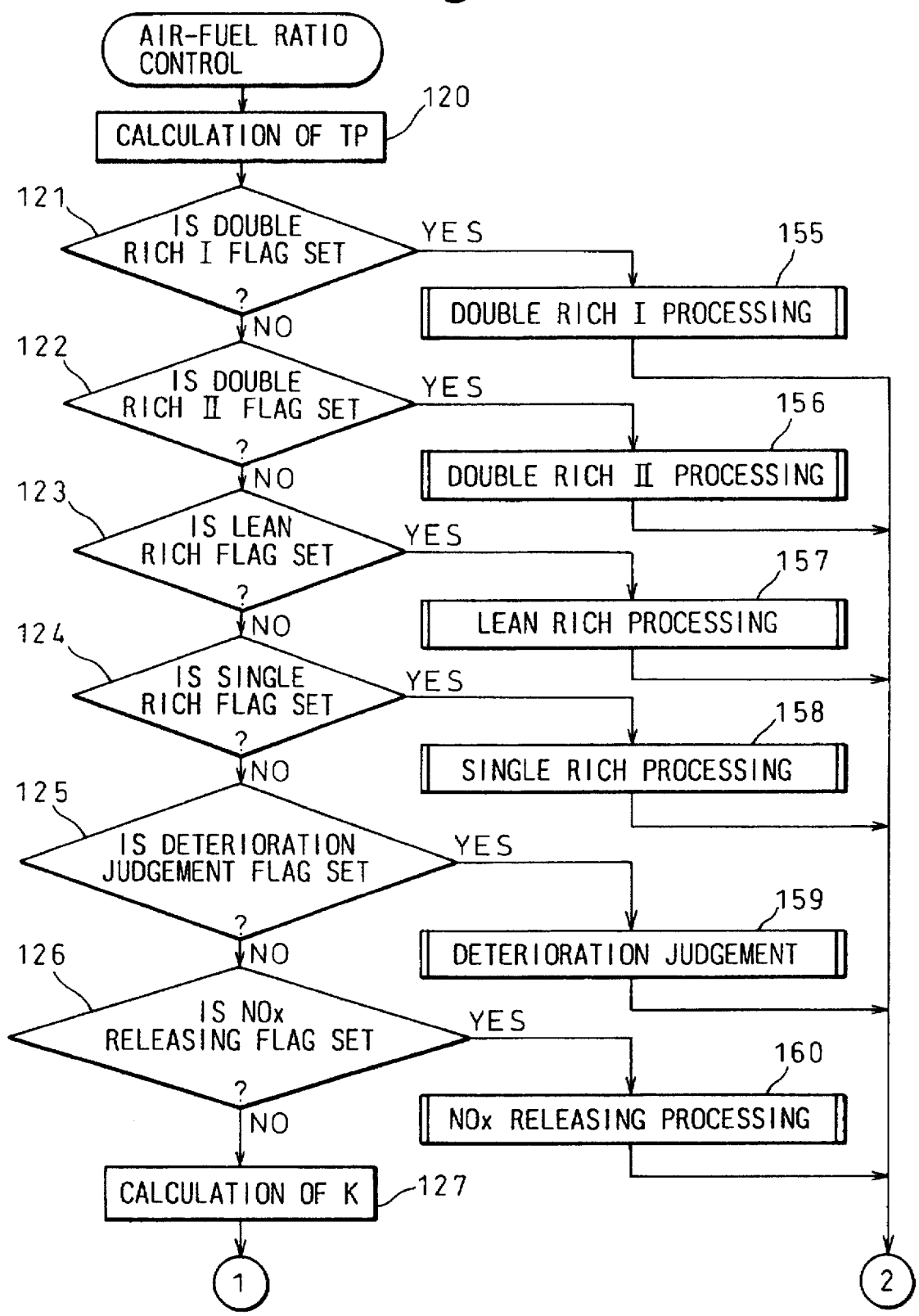
FIGS. 13 to 15 are flow charts of the control of the air-fuel ratio.
Figure 14:
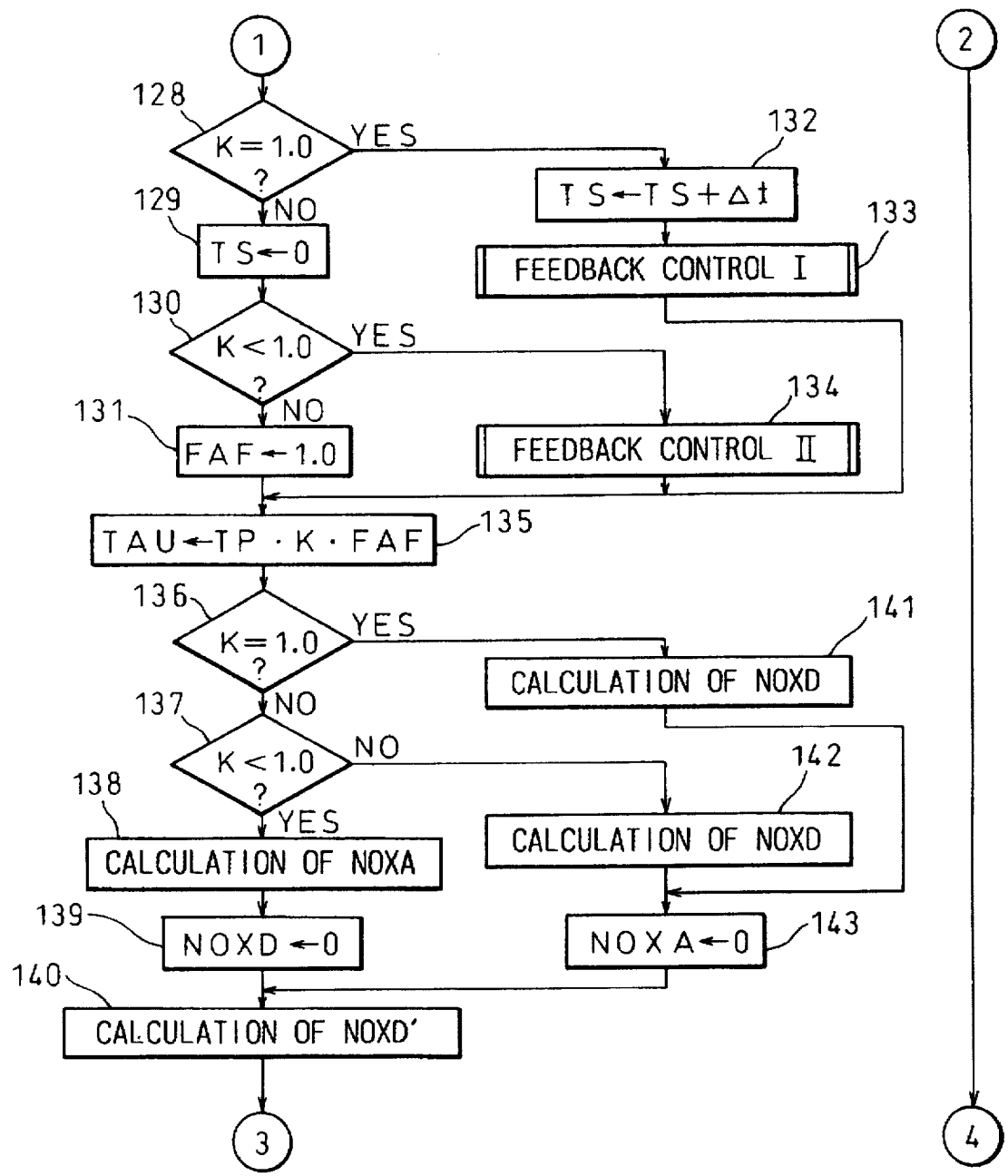
Figure 15:
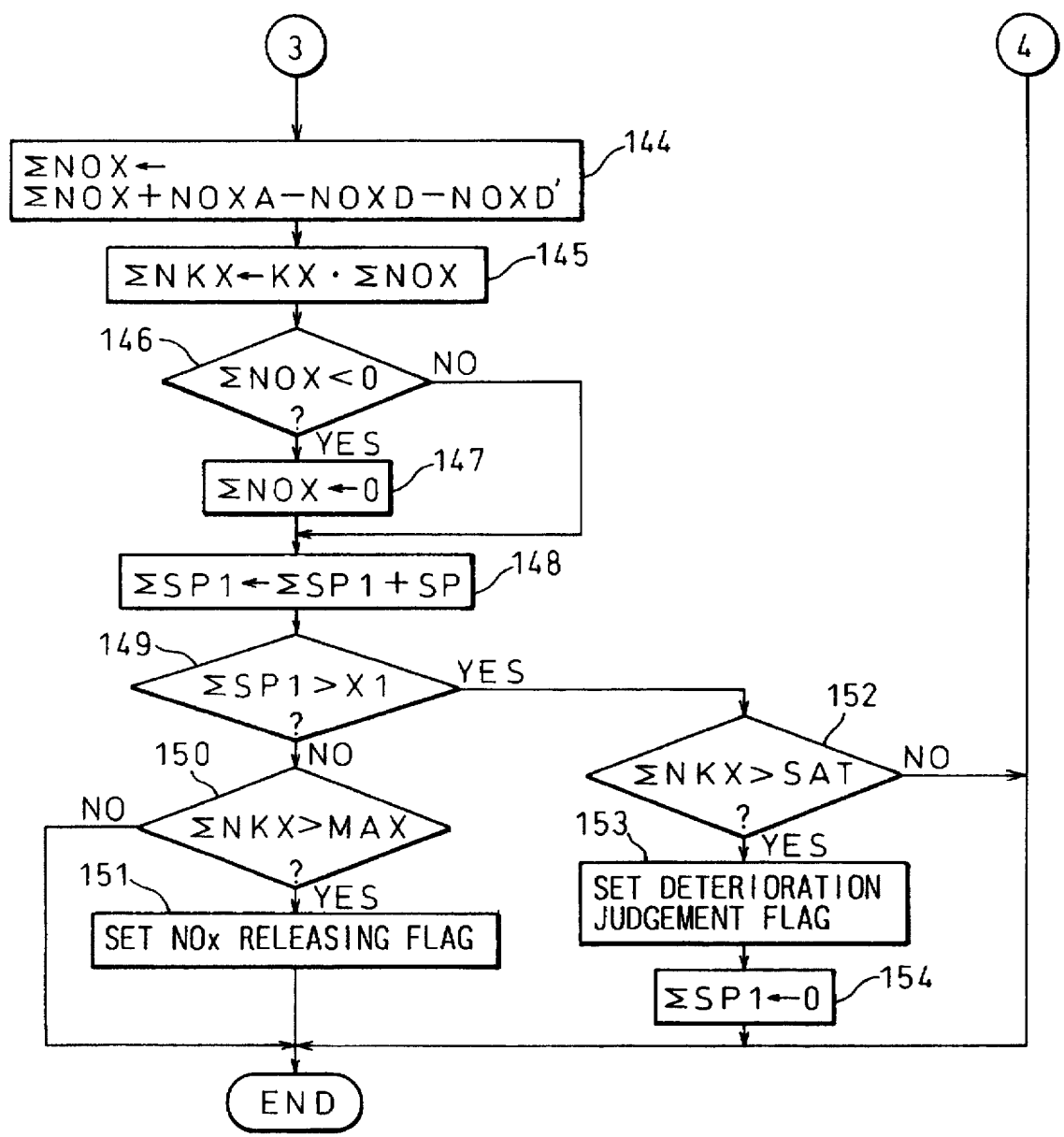

FIG. 13 to FIG. 15 show a routine for control of the air-fuel ratio, which routine is executed by interruption at every predetermined time interval. Referring to FIG. 13 to FIG. 15, first, at step 120, a basic fuel injection time TP is calculated. Subsequently, at step 121, it is determined whether or not the double rich I flag has been set. When the double rich I flag has not been set, the processing routine proceeds to step 122, at which it is determined whether or not the double rich II flag has been set. When the double rich II flag has not been set, the processing routine proceeds to step 123, at which it is determined whether or not the lean/rich flag has been set. When the lean/rich flag has not been set, the processing routine proceeds to step 124, at which it is determined whether or not the single rich flag has been set. When the single rich flag has not been set, the processing routine proceeds to step 125, at which it is determined whether or not a deterioration decision flag indicating that the degree of deterioration of the $NO_x$ absorbing capability of the $NO_x$ absorbent 18 should be decided has been set. When the deterioration decision flag has not been set, the processing routine proceeds to step 126, at which it is determined whether or not the NO$_x$ releasing flag indicating that NO$_x$ should be released from the NO$_x$ absorbent 18 has been set. When the NO$_x$ releasing flag has not been set, the processing routine proceeds to step 127.

Figure 16:
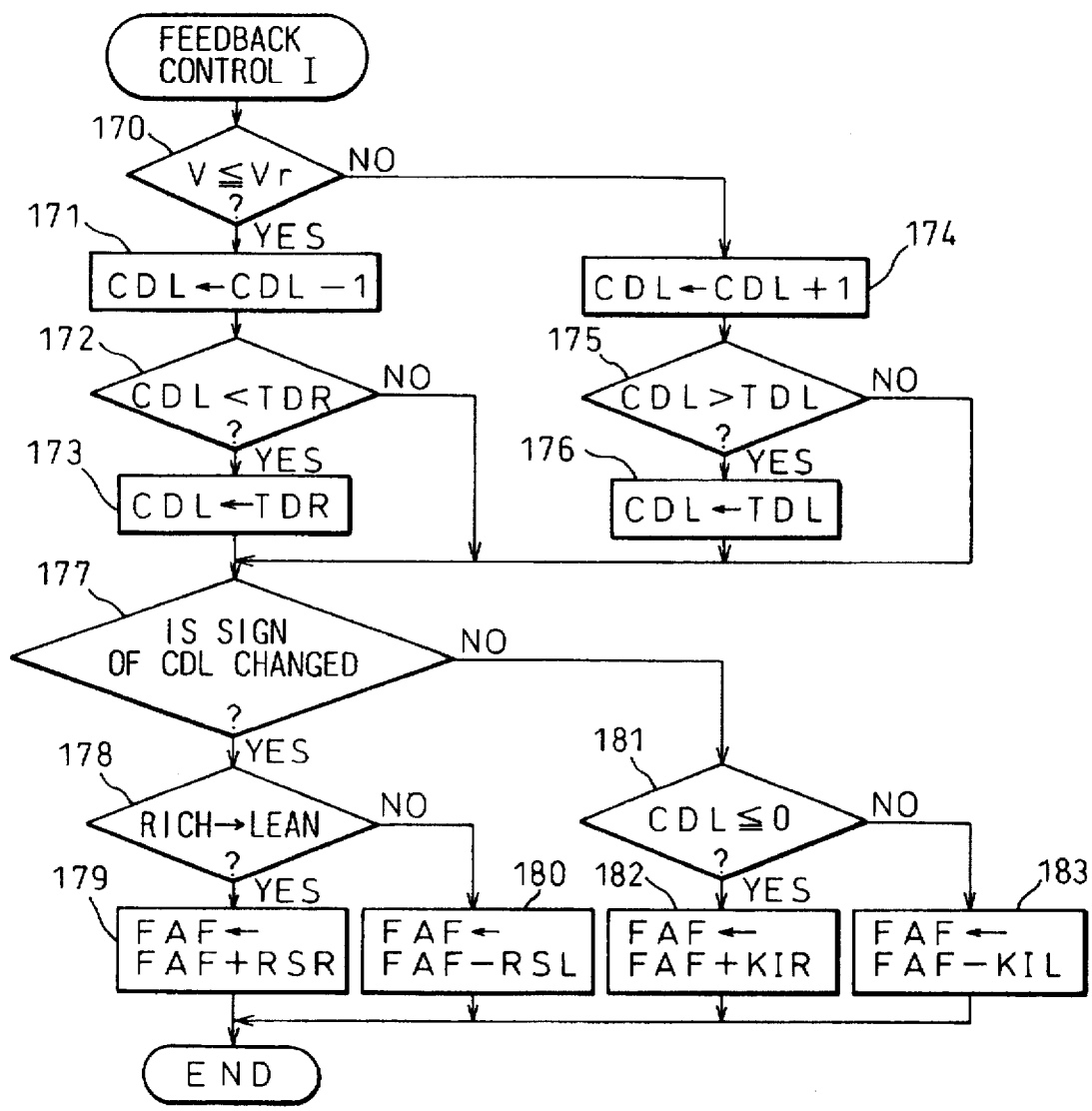
FIG. 16 is a flow chart of the feedback control I.
Figure 18:
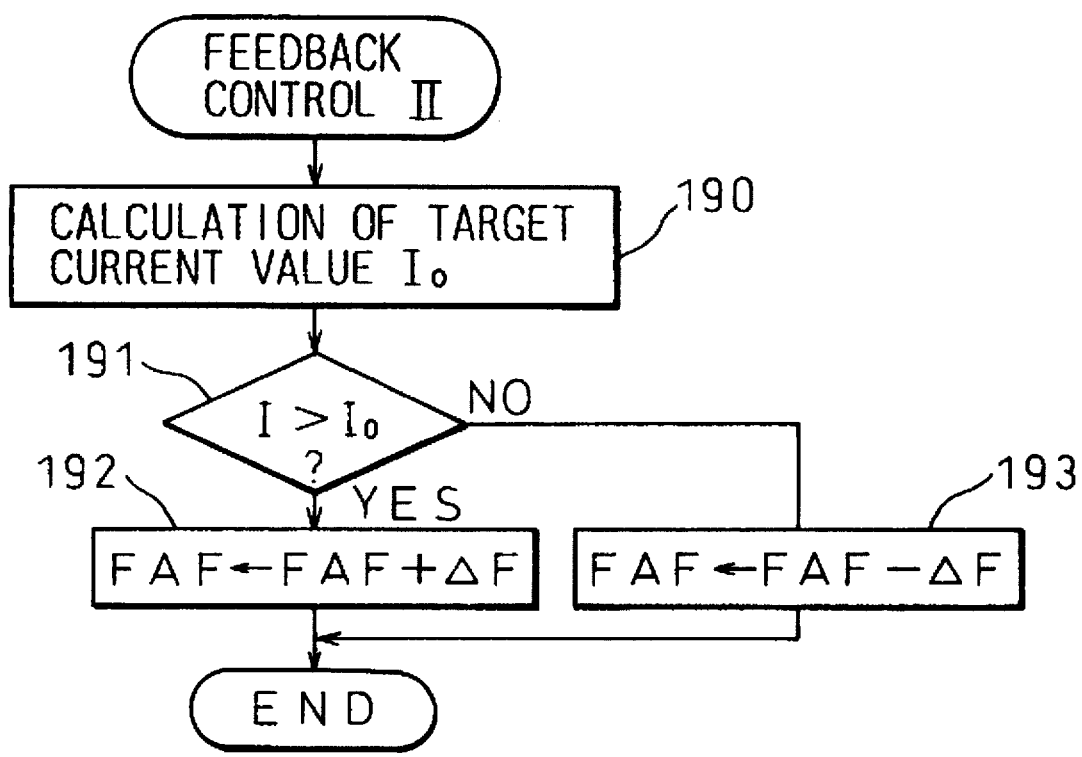
FIG. 18 is a flow chart of the feedback control II.

At step 127, the correction coefficient K is calculated based on FIG. 3. Subsequently, at step 128, it is determined whether or not the correction coefficient K is 1.0. When K=1.0, that is, when the air-fuel ratio of the air-fuel mixture should be made the stoichiometric air-fuel ratio, the processing routine proceeds to step 132, at which an interruption time interval Δt is added to the count TS indicating the time for which the air-fuel ratio is maintained at the stoichiometric air-fuel ratio. Subsequently, at step 133, feedback control I of the air-fuel ratio is carried out. This feedback control I is shown in FIG. 16. On the other hand, when K is not equal to 1.0, the processing routine proceeds to step 129, at which the count TS is made zero. Subsequently, at step 130, it is determined whether or not the correction coefficient K is smaller than 1.0. When K<1.0, that is, when the air-fuel ratio of the air-fuel mixture should be made lean, the processing routine proceeds to step 134, at which the feedback control II of the air-fuel ratio is carried out. This feedback control II is shown in FIG. 18. On the other hand, when K is not smaller than 1.0, the processing routine proceeds to step 130, at which the FAF is fixed to 1.0, and then the processing routine proceeds to step 135. At step 135, the fuel injection time TAU is calculated based on the following equation:

$$TAU=TP \cdot K \cdot FAF$$

Subsequently, at step 136, it is determined whether or not the correction coefficient K is 1.0. When K is not equal to 1.0, that is, when a lean air-fuel mixture or rich air-fuel mixture should be burned, the processing routine proceeds to step 137, at which it is determined whether or not the correction coefficient K is smaller than 1.0. When K<1.0, that is, when a lean air-fuel mixture should be burned, the processing routine proceeds to step 138, at which the amount NOXA of NO$_x$ absorbed is calculated from FIG. 6A. Subsequently, at step 139, the amount NOXD of NO$_x$ released is made zero, and then the processing routine proceeds to step 140. Contrary to this, when it is determined at step 137 that K≧1.0, that is, when a rich air-fuel mixture should be burned, the processing routine proceeds to step 142, at which the amount NOXD of NO$_x$ released is calculated based on the following equation:

$$NOXD=f(K-1) \cdot TP \cdot N$$

Subsequently, at step 143, the amount NOXA of NO$_x$ absorbed is made zero, then the processing routine proceeds to step 140. On the other hand, when it is determined at step 136 that K=1.0, that is, when the air-fuel ratio of the air-fuel mixture should be made the stoichiometric air-fuel ratio, the processing routine proceeds to step 141, at which the amount NOXD of the NO$_x$ released is calculated from the map shown in FIG. 6B. Subsequently, the processing routine passes step 143 and proceeds to step 140. At step 140, the natural amount NOXD' of NO$_x$ released is calculated from the relationship of FIGS. 7A, 7B, and 7C based on the following equation:

$$NOXD'=f(TE) \cdot NOXD"$$

Subsequently, at step 144, the amount ΣNOX of NO$_x$ estimated to be absorbed in the NO$_x$ absorbent 18 is calculated based on the following equation:

$$\Sigma NOX=\Sigma NOX+NOXA-NOXD-NOXD'$$

Subsequently, at step 145, by multiplying the correction value KX with the estimated amount ΣNOX of NO$_x$, the corrected estimated amount of NO$_x$, that is, the actual amount ΣNKX of NO$_x$ is calculated. Subsequently, it is determined at step 146 whether or not ΣNOX becomes negative. When ΣNOX becomes smaller than 0, the processing routine proceeds to step 147, at which ΣNOX is made zero. Subsequently, at step 148, the current vehicle speed SP is added to the cumulative traveling distance ΣSP1. Subsequently, at step 149, it is determined whether or not the cumulative traveling distance ΣSP1 is larger than the set value X1. When ΣSP≦X1, the processing routine proceeds to step 150, at which it is determined whether or not ΣNKX exceeds an allowable maximum value MAX (FIG. 8). When ΣNKX becomes larger than MAX, the processing routine proceeds to step 151, at which the NO$_x$ releasing flag is set.

On the other hand, when it is determined at step 149 that ΣSP>X1, the processing routine proceeds to step 152, at which it is determined whether or not the amount ΣNKX of NO$_x$ becomes larger than the decision level SAT (FIG. 8). When ΣNKX becomes larger than SAT, the processing routine proceeds to step 153, at which the deterioration decision flag is set, and then at step 154, ΣSP1 is made zero.

Figure 19:
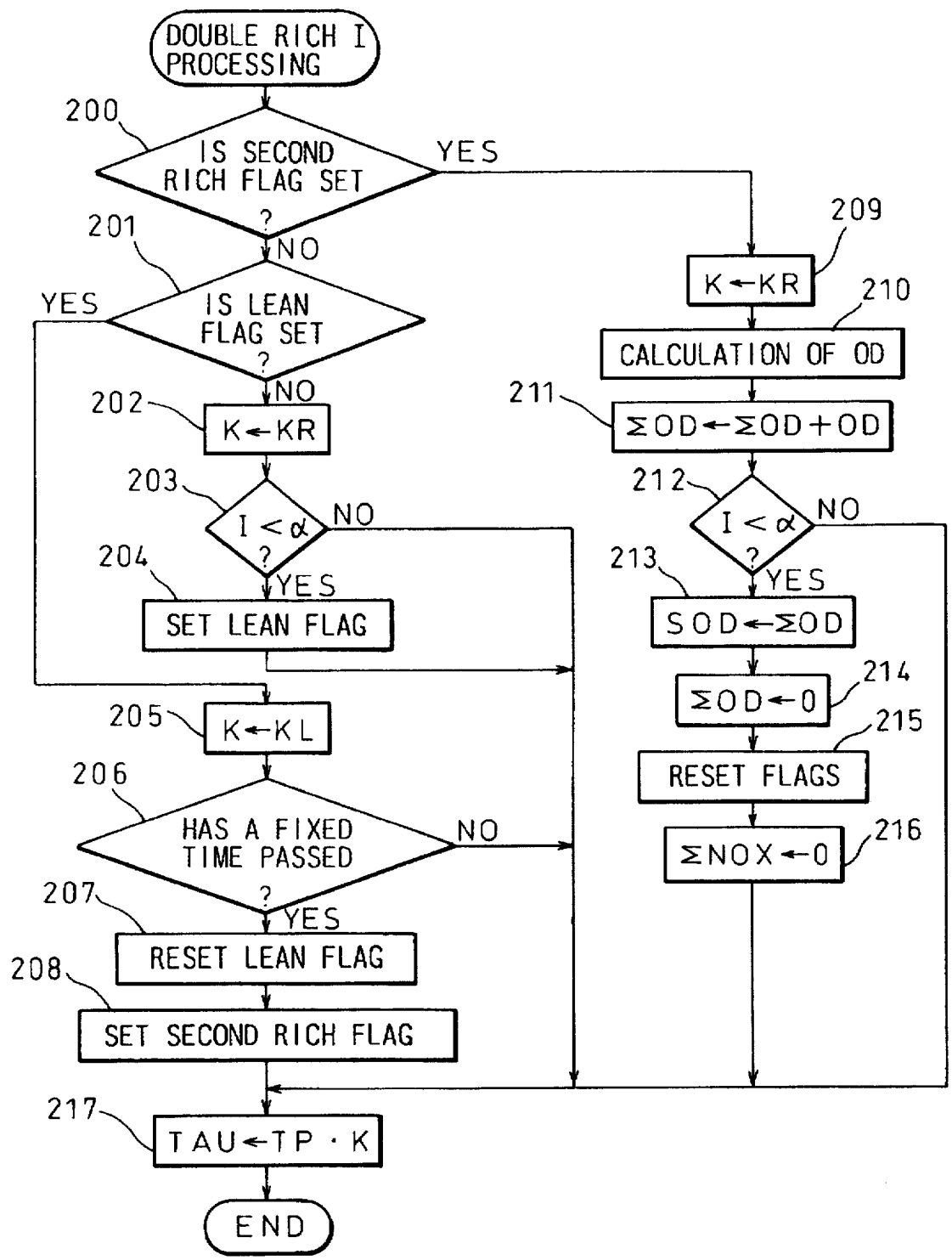
FIG. 19 is a flow chart of a double rich I processing.
Figure 20:
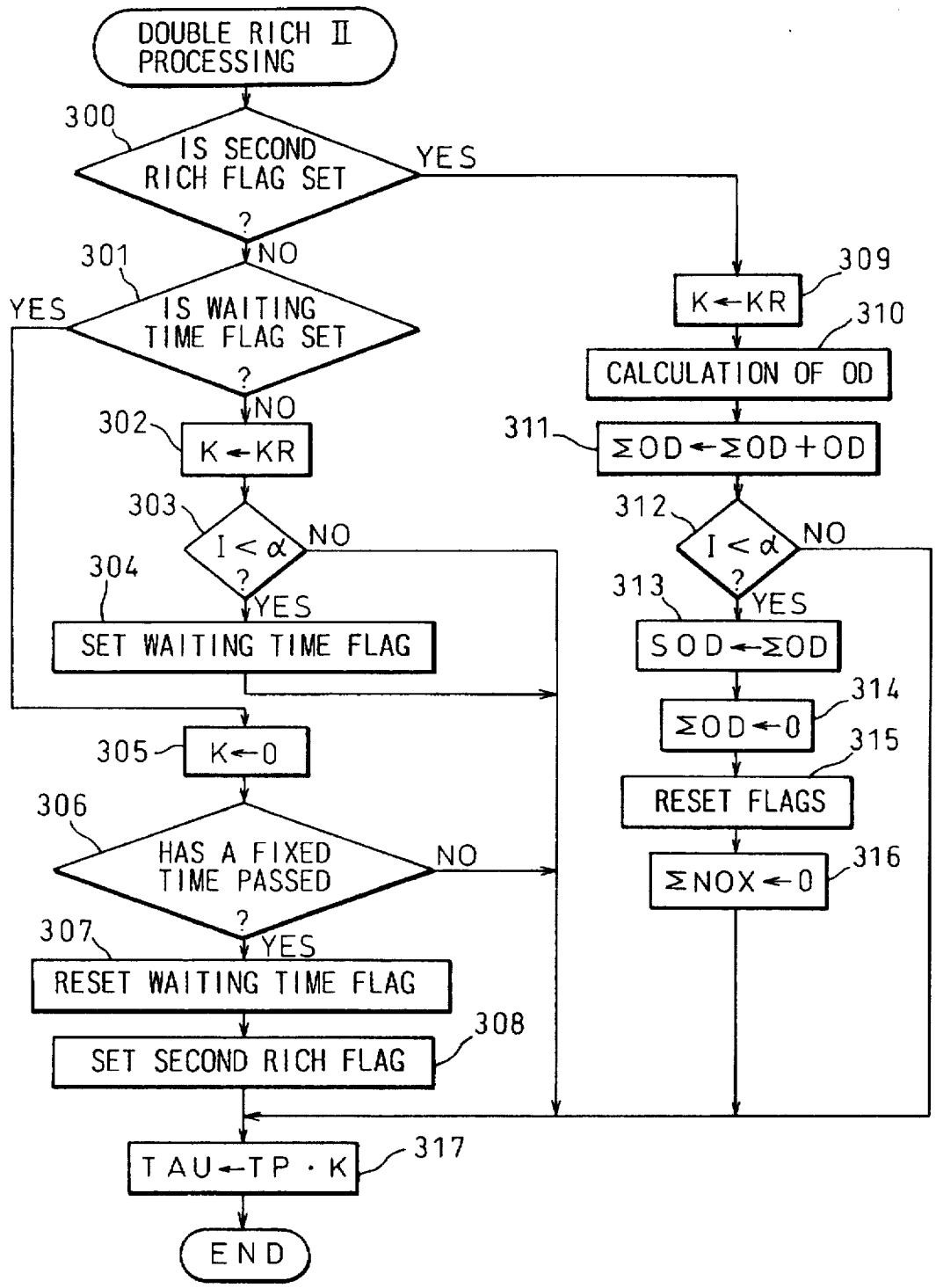
FIG. 20 is a flow chart of a double rich II processing.
Figure 21:
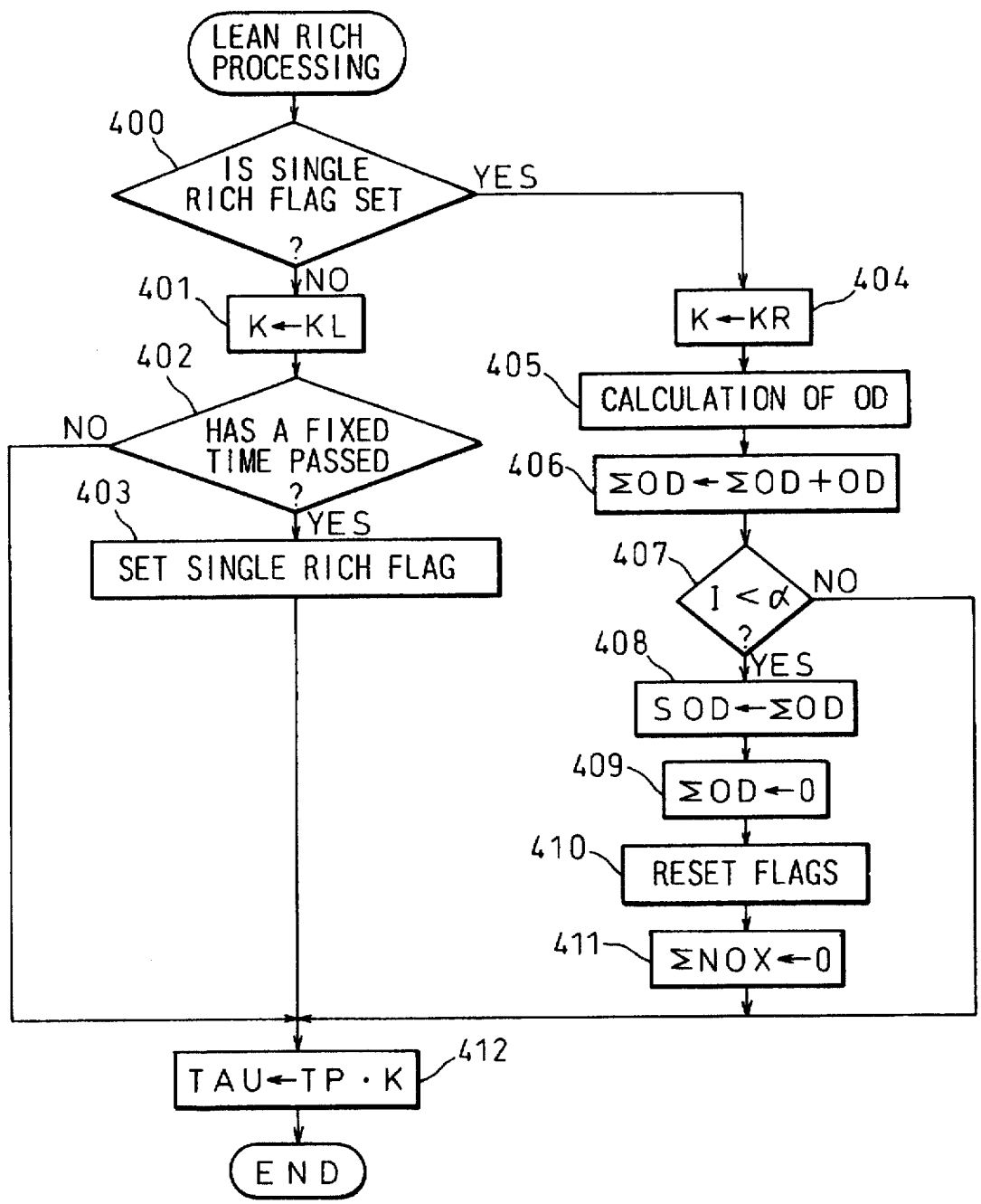
FIG. 21 is a flow chart of a lean/rich processing.
Figure 22:
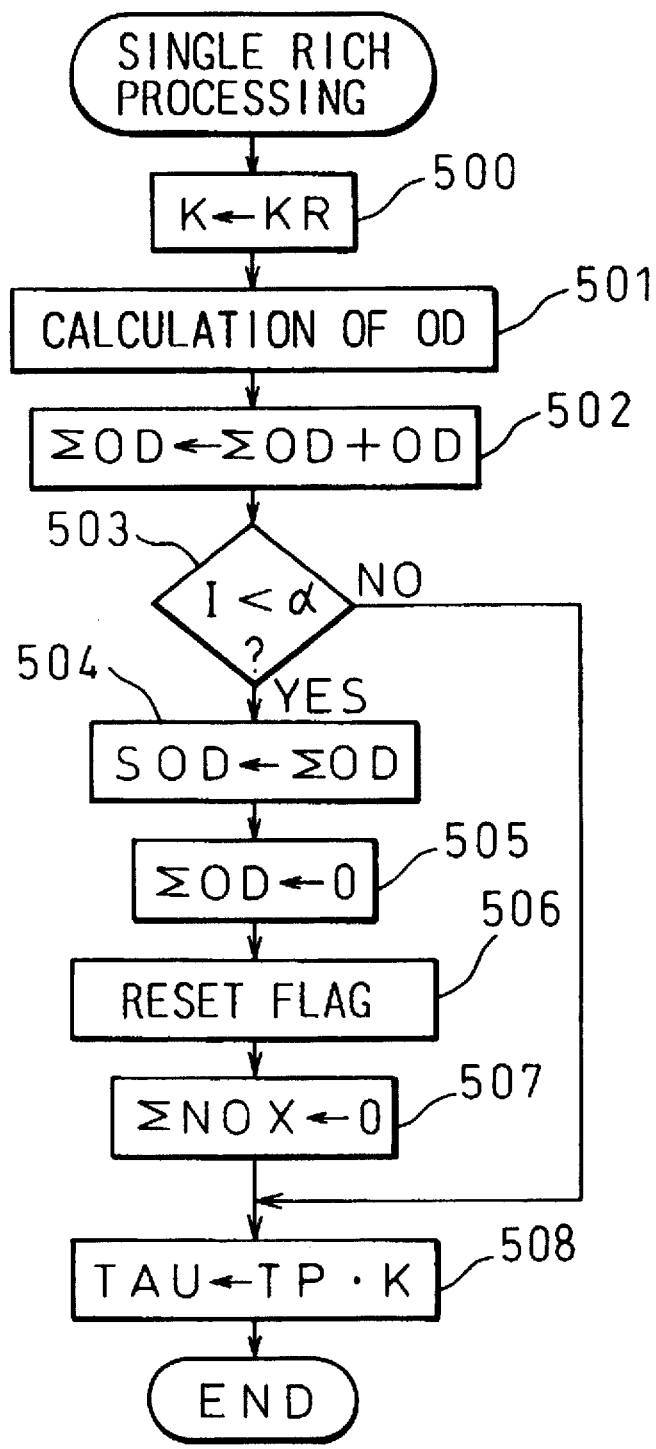
FIG. 22 is a flow chart of a single rich processing.
Figure 23:
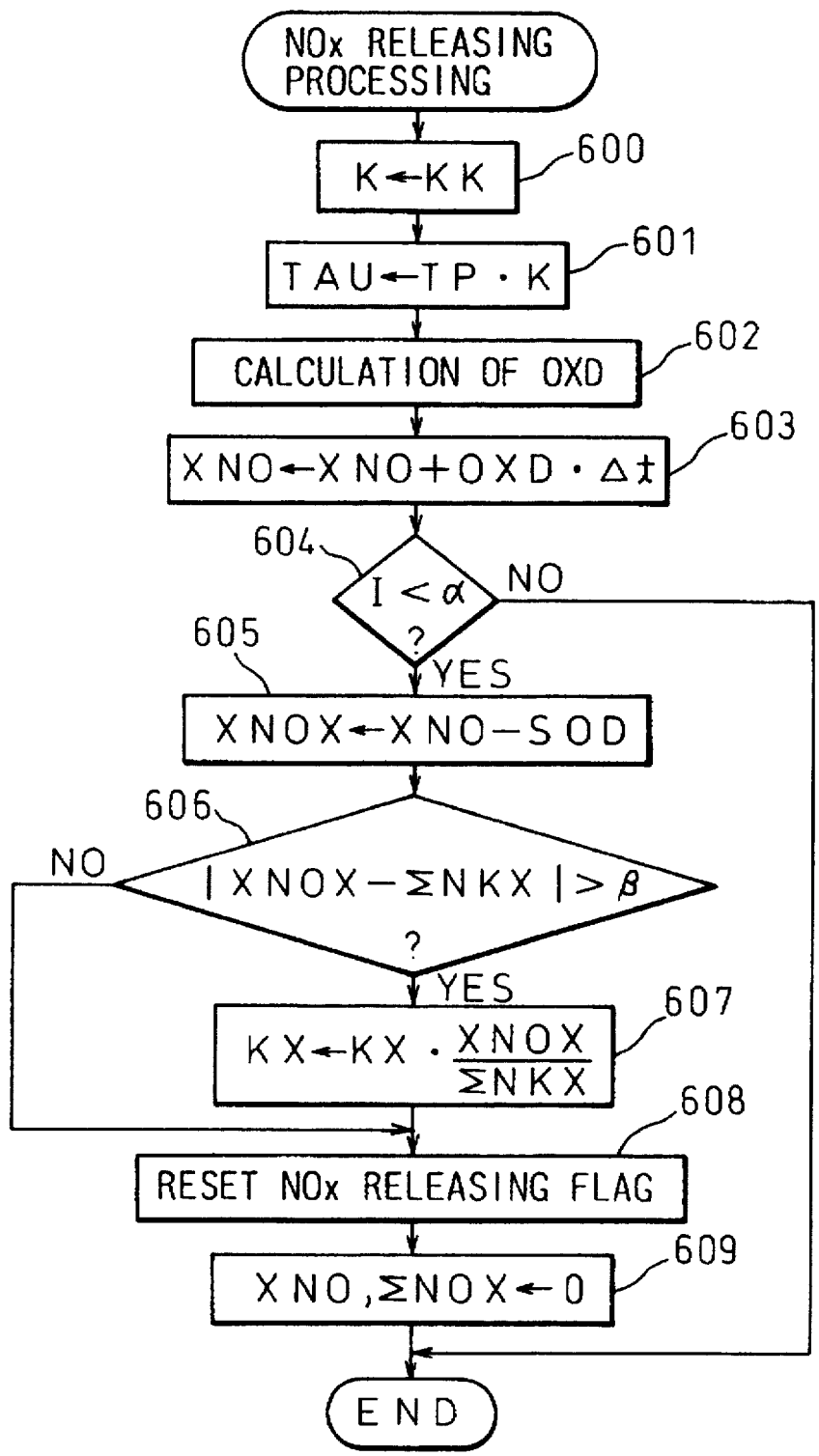
FIG. 23 is a flow chart of a $NO_x$ releasing processing.
Figure 24:
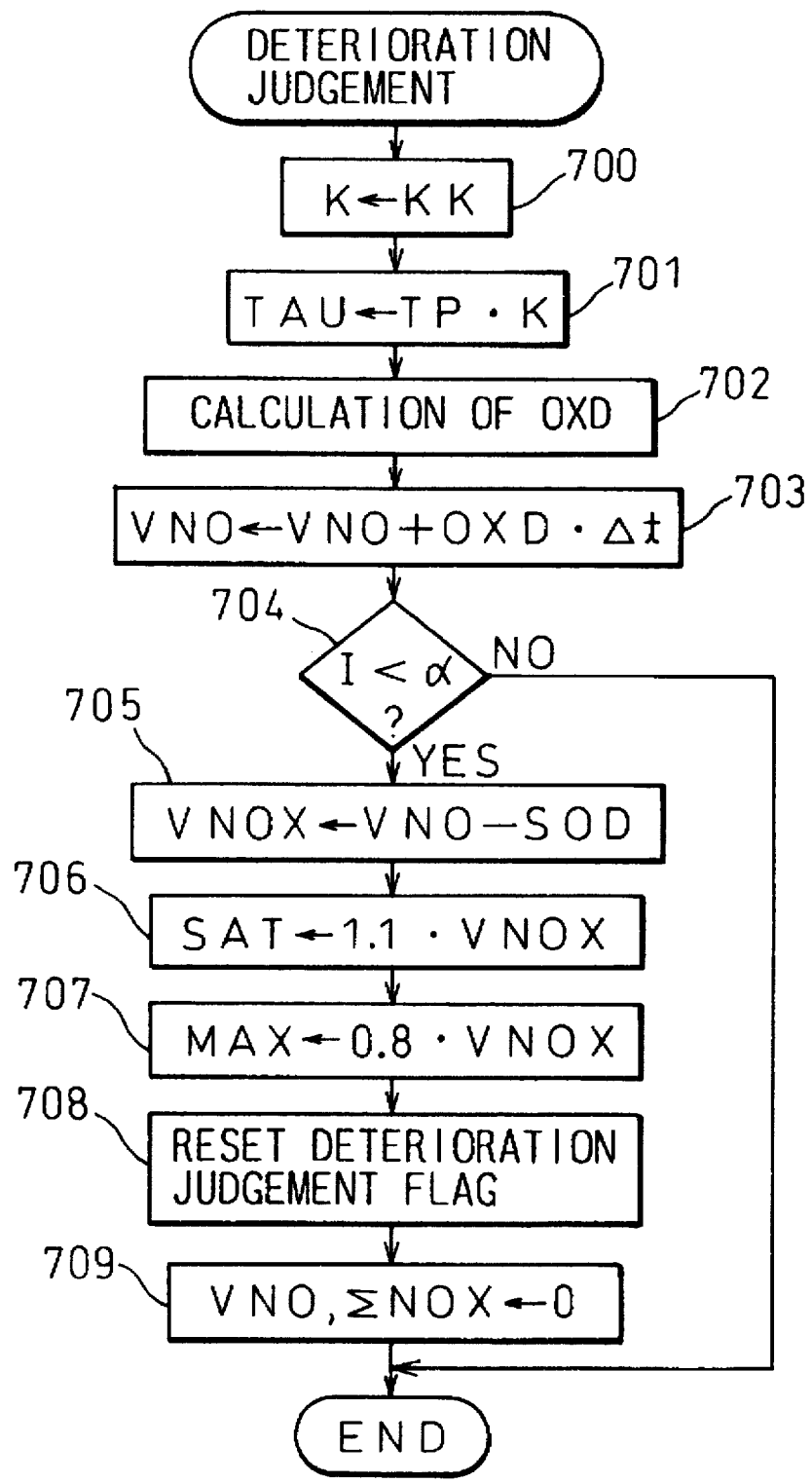
FIG. 24 is a flow chart of a deterioration decision.

When the double rich I flag is set, the processing routine proceeds from step 121 to step 155, at which the double rich I processing is carried out. This double rich I processing is shown in FIG. 19. On the other hand, when the double rich II flag is set, the processing routine proceeds from step 122 to step 156, at which the double rich II processing is carried out. This double rich II processing is shown in FIG. 20. On the other hand, when the lean/rich flag is set, the processing routine proceeds from step 123 to step 157, at which the lean/rich processing is carried out. This lean/rich processing is shown in FIG. 21. On the other hand, when the single rich flag is set, the processing routine proceeds from step 124 to step 158, at which the single rich processing is carried out. This single rich processing is shown in FIG. 22. Further, when the deterioration decision flag is set, the processing routine proceeds from step 125 to step 159, at which the deterioration decision is carried out. This deterioration decision is shown in FIG. 24. On the other hand, when the NO$_x$ releasing flag is set, the processing routine proceeds from step 126 to step 160, at which the NO$_x$ releasing processing is carried out. This NO$_x$ releasing processing is shown in FIG. 23.

Next, an explanation will be made of the feedback control I carried out at step 133 of FIG. 14, that is, the feedback control for maintaining the air-fuel ratio at the stoichiometric air-fuel ratio based on the output signal of the O$_2$ sensor 20 referring to FIG. 16 and FIG. 17.

Figure 17:
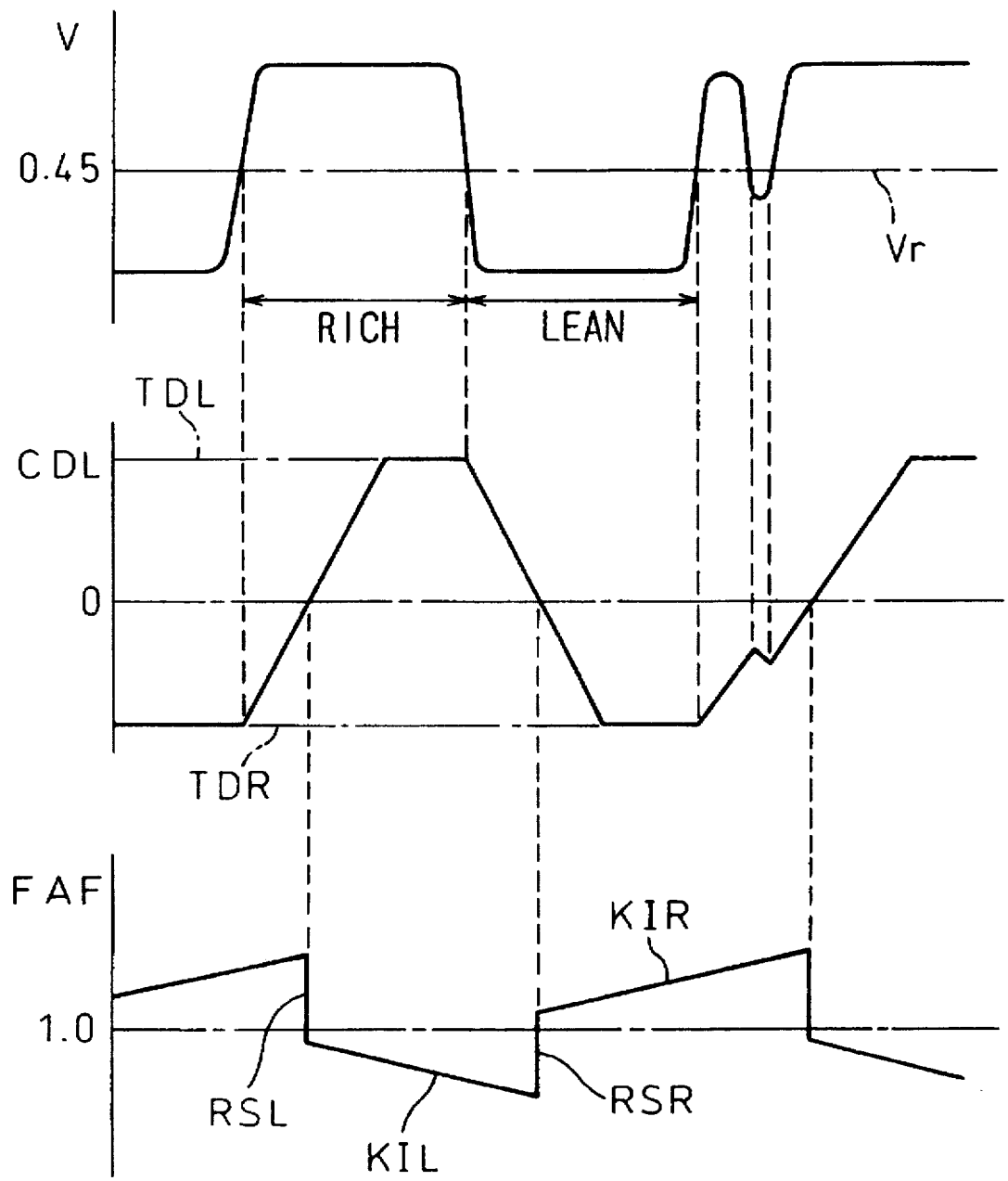
FIG. 17 is a time chart of the change of a feedback correction coefficient FAF.

As shown in FIG. 17, the O$_2$ sensor 20 generates an output voltage V of about 0.9V when the air-fuel ratio of the air-fuel mixture is rich and generates an output voltage V of about 0.1V when the air-fuel ratio of the air-fuel mixture is lean. The feedback control I shown in FIG. 16 is carried out based on the output signal of this O$_2$ sensor 20.

Referring to FIG. 16, first, at step 170, it is determined whether or not the output voltage V of the O$_2$ sensor 20 is smaller than the reference voltage Vr of about 0.45V. When V≦Vr, that is, when the air-fuel ratio is lean, the processing routine proceeds to step 171, at which the delay count CDL is decremented exactly by one. Subsequently, at step 172, it is determined whether or not the delay count CDL becomes smaller than the minimum value TDR. When CDL becomes smaller than TDR, the processing routine proceeds to step 173, at which CDL is made TDR and then the processing routine proceeds to step 177. Accordingly, as shown in FIG. 17, when V becomes equal to or smaller than Vr, the delay count CDL is gradually decreased, and then the CDL is maintained at the minimum value TDR.

On the other hand, when it is determined at step 170 that V>Vr, that is, when the air-fuel ratio is rich, the processing routine proceeds to step 174, at which the delay count CDL is incremented exactly by one. Subsequently, at step 175, it is determined whether or not the delay count CDL becomes larger than the maximum value TDL. When CDL becomes larger than TDL, the processing routine proceeds to step 176, at which the CDL is made TDL, and then the processing routine proceeds to step 177. Accordingly, as shown in FIG. 17, when V becomes larger than Vr, the delay count CDL is gradually increased, and then CDL is maintained at the maximum value TDL.

At step 177, it is determined whether or not the sign of the delay count CDL is inverted from positive to negative or from negative to positive during a period from the previous processing cycle to this processing cycle. When the sign of the delay count CDL is inverted, the processing routine proceeds to step 178, at which it is determined whether or not the inversion is from positive to negative, that is, whether or not the inversion is made from rich to lean. When the inversion is made from rich to lean, the processing routine proceeds to step 179, at which a rich skip value RSR is added to the feedback correction coefficient FAF. Thus FAF is abruptly increased exactly by an amount of the rich skip value RSR as shown in FIG. 17. Contrary to this, in the inversion from lean to rich, the processing routine proceeds to step 180, at which a lean skip value RSL is subtracted from FAF, and thus, as shown in FIG. 17, FAF is abruptly decreased by exactly the amount of lean skip value RSL.

On the other hand, when it is determined at step 177 that the sign of the delay count CDL has not been inverted, the processing routine proceeds to step 181, at which it is determined whether or not the delay count CDL is negative. When CDL≦0, the processing routine proceeds to step 182, at which the rich integration value KIR (KIR<RSR) is added to the feedback correction coefficient FAF, and thus, as shown in FIG. 17, FAF is gradually increased. On the other hand, when CDL>0, the processing routine proceeds to step 183, at which the lean integration value KIL (KIL<RSL) is subtracted from FAF, and thus, as shown in FIG. 17, FAF is gradually decreased. In this way, the air-fuel ratio is controlled to the stoichiometric air-fuel ratio.

Next, an explanation will be made of the feedback control II carried out at step 134 of FIG. 14, that is, the feedback control for maintaining the air-fuel ratio at the target lean air-fuel ratio corresponding to the correction coefficient K based on the current value I of the O₂ sensor 22 referring to FIG. 18.

Referring to FIG. 18, first, at step 190, the target current value $I_0$ corresponding to the target lean air-fuel ratio is calculated from the relationship shown in FIG. 9. Subsequently, at step 191, it is determined whether or not the current value I of the O₂ sensor 22 is larger than the target current value $I_0$. When I>$I_0$, the processing routine proceeds to step 192, at which a constant value ΔF is added to the feedback correction coefficient FAF, and when I≦$I_0$, the processing routine proceeds to step 193, at which the constant value ΔF is subtracted from the feedback correction coefficient FAF. In this way, the air-fuel ratio is maintained at the target lean air-fuel ratio.

Next, an explanation will be made of the double rich I processing carried out at step 155 of FIG. 13 referring to FIG. 19.

Referring to FIG. 19, first, at step 200, it is determined whether or not the second rich flag has been set. When the double rich I processing is commenced, the second rich flag has been reset, and accordingly at this time, the processing routine proceeds to step 201. At step 201, it is determined whether or not the lean flag has been set. When the double rich I processing is commenced, the lean flag has been reset, and accordingly at this time, the processing routine proceeds to step 202. At step 202, the correction coefficient K is made the constant value KR (>1.0). Subsequently, at step 203, it is determined whether or not the current value I of the O₂ sensor 22 has become smaller than the constant value α (FIG. 11). When I≧α, the processing routine proceeds to step 217, at which the fuel injection time TAU is calculated based on the following equation:

$$TAU=TP \cdot K$$

Accordingly, when the double rich I processing is commenced, the air-fuel ratio of the air-fuel mixture is made rich. Subsequently, when it is decided at step 203 that I becomes smaller than α, that is, when all absorbed NO$_x$ and all stored oxygen are released from the NO$_x$ absorbent 18, the processing routine proceeds to step 204, at which the lean flag is set. When the lean flag is set, the processing routine jumps from step 201 to step 205, at which the correction coefficient K is made the constant value KL (<1.0). Subsequently, at step 206, it is determined whether or not a predetermined time has elapsed. When the predetermined time has not elapsed, the processing routine proceeds to step 217. At this time, the air-fuel ratio of the air-fuel mixture is changed from rich to lean.

Subsequently, when the burning of a lean air-fuel mixture continues for a predetermined time, that is, when the oxygen which can be stored in the NO$_x$ absorbent 18 is stored, the processing routine proceeds from step 206 to step 207, at which the lean flag is reset, and then the processing routine proceeds to step 208, at which the second rich flag is set. Subsequently, the processing routine proceeds to step 217.

When the second rich flag is set, the processing routine proceeds from step 200 to step 209, at which the correction coefficient K is made the constant value KR (>1.0) again. That is, the air-fuel ratio of the air-fuel mixture is changed from lean to rich again. Subsequently, at step 210, the amount OD of oxygen released from the NO$_x$ absorbent 18 for a time Δt of from the previous interruption to this interruption is calculated based on the following equation:

$$OD=f(K-1.0) \cdot TP \cdot N \cdot \Delta t$$

Subsequently, at step 211, the oxygen amount OD is added to ΣOD. Subsequently, at step 212, it is determined whether or not the current value I of the O₂ sensor 22 has become smaller than the constant value α (FIG. 11), that is, whether or not all of the oxygen stored in the NO$_x$ absorbent 18 has been released. When I≧α, the processing routine jumps to step 217. On the other hand, when I becomes smaller than α, the processing routine proceeds to step 213, at which the entire amount ΣOD of oxygen stored in the NO$_x$ absorbent 18 is made SOD. Subsequently, at step 214, ΣOD is made zero, and then at step 215, the double rich I flag and the second time rich flag are reset, then at step 216, ΣNOX is made zero. Subsequently, the processing routine proceeds to step 217.

Next, an explanation will be made of the double rich II processing carried out at step 156 of FIG. 13 referring to FIG. 20.

Referring to FIG. 20, first, at step 300, it is determined whether or not the second rich flag has been set. When the double rich I processing II is commenced, the second rich flag has been reset, and accordingly, at this time, the processing routine proceeds to step 301. At step 301, it is determined whether or not the waiting time flag has been set. When the double rich II processing is commenced, the waiting time flag has been reset, and accordingly, at this time, the processing routine proceeds to step 302. At step 302, the correction coefficient K is made the predetermined value KR (>1.0). Subsequently, at step 303, it is determined whether or not the current value I of the $O_2$ sensor 22 has become smaller than the predetermined value $\alpha$ (FIG. 11). When I≧$\alpha$, the processing routine proceeds to step 317, at which the fuel injection time TAU is calculated based on the following equation:

$$TAU=TP \cdot K$$

Accordingly, when the double rich II processing is commenced, the fuel injection is started, and the air-fuel ratio of the air-fuel mixture is made rich. Subsequently, when it is decided at step 303 that I becomes smaller than $\alpha$, that is, when all absorbed $NO_x$ and all stored oxygen are released from the $NO_x$ absorbent 18, the processing routine proceeds to step 304, at which the waiting time flag is set. When the waiting time flag is set, the processing routine jumps from step 301 to step 305, at which the correction coefficient K is made zero. Subsequently, at step 306, it is determined whether or not a predetermined time has elapsed. When the predetermined time has not elapsed, the processing routine proceeds to step 317. At this time, the fuel injection is suspended.

Subsequently, when the suspension of the fuel injection is continued for a predetermined time, that is, when the oxygen which can be stored in the $NO_x$ absorbent 18 is stored, the processing routine proceeds from step 306 to step 307, at which the waiting time flag is reset, and then the processing routine proceeds to step 308, at which the second rich flag is set. Subsequently, the processing routine proceeds to step 317.

When the second rich flag is set, the processing routine proceeds from step 300 to step 309, at which the correction coefficient K is made the predetermined value KR (>1.0) again. Namely, the fuel injection is restarted and the air-fuel ratio of the air-fuel mixture is made rich again. Subsequently, at step 310, the amount OD of oxygen released from the $NO_x$ absorbent 18 during the time $\Delta t$ from the previous interruption to this interruption is calculated based on the following equation:

$$OD=f(K-1.0) \cdot TP \cdot N \cdot \Delta t$$

Subsequently, at step 311, the oxygen amount OD is added to $\Sigma OD$. Subsequently, at step 312, it is determined whether or not the current value I of the $O_2$ sensor 22 has become smaller than the predetermined value $\alpha$ (FIG. 11), that is, whether or not all of the oxygen stored in the $NO_x$ absorbent 18 has been released. When I≧$\alpha$, the processing routine proceeds to step 317. On the other hand, when I becomes smaller than $\alpha$, the processing routine proceeds to step 313, at which the entire amount $\Sigma OD$ of the oxygen stored in the $NO_x$ absorbent 18 is made SOD. Subsequently, at step 314, $\Sigma OD$ is made zero, and then at step 315, the double rich II flag and the second rich flag are reset, and then at step 316, $\Sigma NOX$ is made zero. Subsequently, the processing routine proceeds to step 317.

Next, an explanation will be made of the lean/rich processing carried out at step 157 of FIG. 13 referring to FIG. 21.

Referring to FIG. 21, first, at step 400, it is determined whether or not the first rich flag has been set. When the lean/rich processing is commenced, the first rich flag has been reset, and accordingly, at this time, the processing routine proceeds to step 401. At step 401, the correction coefficient K is made the predetermined value KL (<1.0). Subsequently, at step $O_2$, it is determined whether or not the predetermined time has elapsed. When the predetermined time has not elapsed, the processing routine proceeds to step 412, at which the fuel injection time TAU is calculated by the following equation:

$$TAU=TP \cdot K$$

Accordingly, when the lean/rich processing is commenced, the air-fuel ratio of the air-fuel mixture is changed from the stoichiometric air-fuel ratio to lean.

Subsequently, when the burning of a lean air-fuel mixture is continued for a predetermined time, that is, when the oxygen which can be stored in the $NO_x$ absorbent 18 is stored, the processing routine proceeds from step 402 to step 403, at which the first rich flag is set. Subsequently, the processing routine proceeds to step 412.

When the first rich flag is set, the processing routine proceeds from step 400 to step 404, at which the correction coefficient K is made the predetermined value KR (>1.0). Namely, the air-fuel ratio of the air-fuel mixture is changed from lean to rich. Subsequently, at step 405, the amount OD of oxygen released from the $NO_x$ absorbent 18 in the time $\Delta t$ from the previous interruption to this interruption is calculated based on the following equation:

$$OD=f(K-1.0) \cdot TP \cdot N \cdot \Delta t$$

Subsequently, at step 406, the oxygen amount OD is added to $\Sigma OD$. Subsequently, at step 407, it is determined whether or not the current value I of the $O_2$ sensor 22 has become smaller than the predetermined value $\alpha$ (FIG. 11), that is, whether or not all of the oxygen stored in the $NO_x$ absorbent 18 is released. When I≧$\alpha$, the processing routine proceeds to step 412. On the other hand, when I becomes smaller than $\alpha$, the processing routine proceeds to step 408, at which the entire amount $\Sigma OD$ of oxygen stored in the $NO_x$ absorbent 18 is made the SOD. Subsequently, at step 409, $\Sigma OD$ is made zero. Then, at step 410, the lean/rich flag and first rich flag are reset, and then at step 411, $\Sigma NOX$ is made zero. Subsequently, the processing routine proceeds to step 412.

Next, an explanation will be made of the single rich processing carried out at step 158 of FIG. 13 referring to FIG. 22.

Referring to FIG. 22, first, at step 500, the correction coefficient K is made the predetermined value KR (>1.0). Namely, the air-fuel ratio of the air-fuel mixture is changed from lean to rich. Subsequently, at step 501, the amount OD of oxygen released from the $NO_x$ absorbent 18 in the time $\Delta t$ from the previous interruption to this interruption is calculated based on the following equation:

$$OD=f(K-1.0) \cdot TP \cdot N \cdot \Delta t$$

Subsequently, at step 502, the oxygen amount OD is added to $\Sigma OD$. Subsequently, at step 503, it is determined whether or not the current value I of the $O_2$ sensor 22 has become smaller than the predetermined value $\alpha$ (FIG. 11), that is, whether or not all of the oxygen stored in the $NO_x$ absorbent 18 is released. When I≧$\alpha$, the processing routine jumps to step 508, and the fuel injection time TAU is calculated based on the following equation:

$$TAU = TP \cdot K$$

On the other hand, when I becomes smaller than α, the processing routine proceeds to step 504, at which the entire amount ΣOD of oxygen stored in the $NO_x$ absorbent 18 is made the SOD. Subsequently, at step 505, ΣOD is made zero, then at step 506, the single rich flag is reset, and then at step 507, ΣNOX is made zero. Subsequently, the processing routine proceeds to step 508.

Next, an explanation will be made of the $NO_x$ releasing processing carried out at step 160 of FIG. 13 referring to FIG. 23. Referring to FIG. 23, first, at step 600, the correction coefficient K is made the predetermined value KK of for example about 0.3. Subsequently, at step 601, the fuel injection time TAU is calculated based on the following equation:

$$TAU = TP \cdot K$$

Accordingly, when the $NO_x$ releasing processing is commenced, the feedback control of the air-fuel ratio is suspended, and the air-fuel ratio of the air-fuel mixture is made rich. Subsequently, at step 602, the sum OXD of the amount of release of $NO_x$ and amount of release of oxygen from the $NO_x$ absorbent 18 per unit time is calculated based on the following equation:

$$OXD = f \cdot (K-1.0) \cdot TP \cdot N$$

Subsequently, at step 603, the sum XNO of the amount of release of $NO_x$ and the amount of release of oxygen which are actually released from the $NO_x$ absorbent 18 is calculated based on the following equation. Note that, in the following equation, Δt represents the interval of time interruption.

$$XNO = XNO + OXD \cdot \Delta t$$

Subsequently, at step 604, it is determined whether or not the current value I of the $O_2$ sensor 22 becomes lower than the preliminarily determined constant value α (FIG. 11). When I becomes smaller than α, the processing routine proceeds to step 605, at which by subtracting the amount SOD of oxygen which can be stored in the $NO_x$ absorbent 18 from the sum XNO of the amount of $NO_x$ and amount of oxygen actually released from the $NO_x$ absorbent 18, the amount $XNO_x$ of $NO_x$ actually absorbed in the absorbent 18 (=XNO−SOD) is calculated. Subsequently, the processing routine proceeds to step 606, at which it is determined whether or not the absolute value $|XNO_x - \Sigma NKX|$ of the difference between the actual amount $XNO_x$ of $NO_x$ released and the corrected estimated amount ΣNKX of $NO_x$ absorbed is larger than the predetermined value β.

When $|XNO_x - \Sigma NKX| \leq \beta$, the processing routine jumps to step 608. Contrary to this, when $|XNO_x - \Sigma NKX| > \beta$, the processing routine proceeds to step 607, at which the correction value KX is updated based on the following equation:

$$KX = KX \cdot XNO_x / \Sigma NKX$$

Subsequently, at step 608, the $NO_x$ releasing flag is reset, and thus the air-fuel ratio of the air-fuel mixture is changed from rich to the air-fuel ratio determined according to the operating state at that time, usually lean. Subsequently, at step 609, XNO and ΣNOX are made zero.

Next, an explanation will be made of the deterioration decision carried out at step 159 of FIG. 13 referring to FIG. 24.

Referring to FIG. 24, first, at step 700, the correction coefficient K is made the predetermined value KK of for example about 1.3. Then, at step 701, the fuel injection time TAU is calculated based on the following equation:

$$TAU = TP \cdot K$$

Accordingly, when the deterioration decision is commenced, the feedback control of the air-fuel ratio is suspended, and the air-fuel ratio of the air-fuel mixture is made rich. Subsequently, at step 702, the sum OXD of the amount of $NO_x$ released and amount of oxygen released from the $NO_x$ absorbent 18 per unit time is calculated based on the following equation:

$$OXD = f \cdot (K-1.0) \cdot TP \cdot N$$

Subsequently, at step 703, the sum VNO of the amount of $NO_x$ released and the amount of oxygen released which are actually released from the $NO_x$ absorbent 18 is calculated based on the following equation. Note that, in the following equation, Δt represents the interval of time interruption.

$$VNO = VNO + OXD \cdot \Delta t$$

Subsequently, at step 704, it is determined whether or not the current value I of the $O_2$ sensor 22 becomes lower than the preliminarily determined constant value α (FIG. 11). When I becomes smaller than α, the processing routine proceeds to step 705, at which by subtracting the amount SOD of oxygen which can be stored in the $NO_x$ absorbent 18 from the sum VNO of the amount of $NO_x$ and amount of oxygen actually released from the $NO_x$ absorbent 18, the amount $VNO_x$ of $NO_x$ actually absorbed in the absorbent 18 (=VNO−SOD) is calculated.

Subsequently, at step 706, by multiplying a constant value larger than 1.0, for example, 1.1, with the $VNO_x$, the decision level SAT ($=1.1 \cdot VNO_x$) is calculated. Since the decision level SAT is made a value larger than $VNO_x$, in this way, this $VNO_x$ represents the maximum amount of $NO_x$ which can be absorbed by the $NO_x$ absorbent 18. Namely, if $VNO_x$ represents an amount of absorption of $NO_x$ smaller than the maximum amount of absorption of $NO_x$, whenever the deterioration decision is carried out, the decision level SAT becomes larger, and thus finally $VNO_x$ will represent the maximum amount of absorption of $NO_x$, that is, the degree of deterioration of the $NO_x$ absorbent 18.

To find the decision level SAT, of course it is also possible to multiply another numerical value other than 1.1 with $VNO_x$. The decision level SAT can be found by multiplying any number of 1.0 or more with $VNO_x$. However, when the numerical value to be multiplied with $VNO_x$ is made too large, the time after the amount of absorption of $NO_x$ of the $NO_x$ absorbent 18 becomes the maximum amount of absorption of $NO_x$ to when the action of releasing $NO_x$ is carried out becomes too long, so the amount of discharge of $NO_x$ into the atmosphere is increased. Accordingly, it is not preferred that the numerical value to be multiplied with $VNO_x$ be made too large. Preferably this numerical value is not more than about 1.3.

When the decision level SAT is calculated at step 706, the processing routine proceeds to step 707, at which by multiplying a positive value of up to 1.0, for example, 0.8, with $VNO_x$, the allowable maximum value MAX ($=0.8 \cdot VNO_x$) is calculated. Namely, also the allowable maximum value MAX is updated in accordance with the degree of deterioration of the $NO_x$ absorbent 18. Subsequently, at step 708, the deterioration decision flag is reset. When the deterioration decision flag is reset, the air-fuel ratio of the air-fuel mixture is changed from rich to the air-fuel ratio in accordance with the operating state at that time, usually lean. Subsequently, at step 709, VNO and ΣNOX are made zero.

As mentioned above, according to the present invention, the amount of stored oxygen of the $NO_x$ absorbent can be detected, and thus the degree of deterioration of the $NO_x$ absorbent due to the lowering of the $O_2$ storage function can be detected. Further, in the present invention, the amount of absorption of $NO_x$ of the $NO_x$ absorbent can be correctly detected, and thus the degree of deterioration of the $NO_x$ absorbing capability can be correctly detected.

While the invention has been described by reference to specific embodiments chosen for purposes of illustration, it should be apparent that numerous modifications could be made thereto by those skilled in the art without departing from the basic concept and scope of the invention.

We claim:

1. A device for detecting deterioration of a $NO_x$ absorbent arranged in an exhaust passage of an engine, said $NO_x$ absorbent absorbing $NO_x$ and storing oxygen therein when an air-fuel ratio of exhaust gas flowing into the $NO_x$ absorbent is lean and releasing absorbed $NO_x$ and stored oxygen therefrom when the air-fuel ratio of exhaust gas flowing into the $NO_x$ absorbent becomes rich, said device comprising:

air-fuel ratio detecting means arranged in the exhaust passage downstream of the $NO_x$ absorbent for producing an output signal indicating an air-fuel ratio of exhaust gas which flows out from the $NO_x$ absorbent;

air-fuel ratio changing means for changing the air-fuel ratio of exhaust gas flowing into the $NO_x$ absorbent from lean to rich when an amount of $NO_x$ absorbed in the $NO_x$ absorbent is almost zero; and oxygen amount detecting means for detecting an amount of oxygen stored in the $NO_x$ absorbent on the basis of the output signal of said air-fuel ratio detecting means after the air-fuel ratio of exhaust gas flowing into the $NO_x$ absorbent is changed from lean to rich by said air-fuel ratio changing means.

2. A device as set forth in claim 1, wherein the degree of deterioration of the oxidation reduction ability of the $NO_x$ absorbent is judged based on the amount of oxygen detected by said air-fuel ratio detecting means.

3. A device as set forth in claim 1, wherein said air-fuel ratio detecting means generates an output signal showing that the air-fuel ratio is slightly lean in the period after the air-fuel ratio of the exhaust gas flowing into the $NO_x$ absorbent is changed from lean to rich by said air-fuel ratio changing means while oxygen is being released from the $NO_x$ absorbent and generates an output signal showing that the air-fuel ratio is rich when the action of releasing oxygen from the $NO_x$ absorbent is completed.

4. A device as set forth in claim 3 wherein said air-fuel ratio detecting means is comprised of an air-fuel ratio detection sensor where the output current increases in proportion to the increase of the air-fuel ratio.

5. A device as set forth in claim 3 wherein said oxygen amount detecting means reduces the amount of storage of oxygen in accordance with the amount of release of oxygen determined by the operating state of the engine during a period from when the air-fuel ratio is changed from lean to rich by said air-fuel ratio changing means to when said air-fuel ratio detecting means generates an output signal showing that the air-fuel ratio of the exhaust gas flowing into the $NO_x$ absorbent is rich and thereby calculates the entire amount of the oxygen stored in the $NO_x$ absorbent.

6. A device as set forth in claim 5, wherein said amount of oxygen determined by the engine operating state is proportional to the amount of excess fuel.

7. A device as set forth in claim 1, wherein judgement means is provided for judging if the amount of $NO_x$ absorbed in the $NO_x$ absorbent should be made substantially zero and, when it is judged by said judgement means that the amount of $NO_x$ absorbed in the $NO_x$ absorbent should be made substantially zero, said air-fuel ratio changing means changing the air-fuel ratio of the exhaust gas flowing into the $NO_x$ absorbent from rich to lean and then holding it lean temporarily, then changing it from lean to rich and said oxygen amount detecting means detects the amount of oxygen stored in the $NO_x$ absorbent based on the output signal of the air-fuel ratio detecting means after the second switching from lean to rich.

8. A device as set forth in claim 7, wherein said judgement means judges if the amount of $NO_x$ absorbed in the $NO_x$ absorbent is substantially zero and, when the amount of $NO_x$ absorbed in the $NO_x$ absorbent is not substantially zero, judges that the amount of $NO_x$ absorbed in the $NO_x$ absorbent should be made substantially zero.

9. A device as set forth in claim 7, wherein said judgement means judges if the engine operating state is a deceleration state where the supply of fuel should be stopped and, when the engine operating state is a deceleration state where the supply of fuel should be stopped, it is judged that the amount of $NO_x$ absorbed in the $NO_x$ absorbent should be made substantially zero.

10. A device as set forth in claim 9, wherein said air-fuel ratio changing means temporarily holds the air-fuel ratio of the exhaust gas flowing into the $NO_x$ absorbent lean by stopping the supply of fuel.

11. A device as set forth in claim 7, wherein said air-fuel ratio changing means changes the air-fuel ratio of the exhaust gas flowing into the $NO_x$ absorbent from rich to lean based on an output signal of the air-fuel ratio detecting means after the first change of the air-fuel ratio of the exhaust gas flowing into the $NO_x$ absorbent from lean to rich.

12. A device as set forth in claim 1, wherein judgement means is provided for judging if the amount of $NO_x$ absorbed in the $NO_x$ absorbent is substantially zero and, when a lean air-fuel mixture is being burned and said judgement means judges that the $NO_x$ absorbed in the $NO_x$ absorbent is substantially zero, said air-fuel ratio changing means changes the air-fuel ratio of the exhaust gas flowing into the $NO_x$ absorbent from lean to rich, and said oxygen amount detecting means detects the amount of oxygen stored in the $NO_x$ absorbent based on the output signal of the air-fuel ratio detecting means after this change from lean to rich.

13. A device as set forth in claim 1, wherein judgement means is provided for judging if the amount of $NO_x$ absorbed in the $NO_x$ absorbent is substantially zero and, when an air-fuel mixture of the stoichiometric air-fuel ratio is being burned and said judgement means judges that the $NO_x$ absorbed in the $NO_x$ absorbent is substantially zero, said air-fuel ratio changing means changes the air-fuel ratio of the exhaust gas flowing into the $NO_x$ absorbent from the stoichiometric air-fuel ratio to lean and then temporarily thereafter maintains it lean, then changes it from lean to rich, and said oxygen amount detecting means detects the amount of oxygen stored in the $NO_x$ absorbent based on the output signal of the air-fuel ratio detecting means after this change from lean to rich.

14. A device as set forth in claim 13, wherein said judgement means judges if the time of continuous operation of the engine at the stoichiometric air-fuel ratio has exceeded a predetermined time and, when said time of continuous operation of the engine at the stoichiometric air-fuel ratio has exceeded the predetermined time, it is judged that the amount of $NO_x$ absorbed in the $NO_x$ absorbent is substantially zero.

15. A device as set forth in claim 1, comprising $NO_x$ amount detecting means for detecting the sum of the amount of oxygen stored in the $NO_x$ absorbent and the amount of $NO_x$ absorbed in the $NO_x$ absorbent based on the output signal of the air-fuel ratio detecting means after the air-fuel ratio of the exhaust gas flowing into the $NO_x$ absorbent is changed from lean to rich by the air-fuel ratio changing means and $NO_x$ amount calculating means for calculating the amount of $NO_x$ absorbed in the $NO_x$ absorbent by subtracting the amount of oxygen detected by said oxygen amount detecting means from the sum of the amount of oxygen and the amount of $NO_x$.

16. A device as set forth in claim 15, wherein the degree of deterioration of the $NO_x$ absorbing ability of the $NO_x$ absorbent is judged based on the amount of $NO_x$ calculated by the $NO_x$ amount calculating means.

17. A device according to claim 15, wherein said air-fuel ratio detecting means generates an output signal indicating that the air-fuel ratio of the exhaust gas flowing into the $NO_x$ absorbent is slightly lean during a period for which the oxygen and $NO_x$ are released from the $NO_x$ absorbent after the air-fuel ratio of the exhaust gas is changed from lean to rich and generates an output signal indicating that the air-fuel ratio is rich when the oxygen and $NO_x$ releasing action from the $NO_x$ absorbent is completed.

18. A device as set forth in claim 17, wherein said air-fuel ratio detecting means comprises an air-fuel ratio detection sensor which increases its output current proportional to the increase of the air-fuel ratio.

19. A device as set forth in claim 17, wherein said oxygen and $NO_x$ amount calculating means decreases the sum of the amount of storage of oxygen and the amount of storage of $NO_x$ in accordance with the sum of the amount of release of oxygen and the amount of release of $NO_x$ determined according to the engine operating state during a period from when the air-fuel ratio of the exhaust gas flowing into the $NO_x$ absorbent is changed from lean to rich by said air-fuel ratio control means to when said air-fuel ratio detecting means generates the output signal indicating that the air-fuel ratio is rich and thereby calculates the sum of the entire amount of oxygen and the entire amount of $NO_x$ stored in the $NO_x$ absorbent.

20. A device as set forth in claim 19, wherein said sum of the amount of release of oxygen and amount of release of $NO_x$ determined according to the engine operating state is proportional to the excess fuel amount.

21. A device as set forth in claim 1, wherein said device comprises estimating means for estimating an amount of $NO_x$ absorbed in the $NO_x$ absorbent to obtain an estimated amount of $NO_x$ stored in the $NO_x$ absorbent;

air-fuel ratio control means for changing the air-fuel ratio of exhaust gas flowing into the $NO_x$ absorbent from lean to rich separately from the operation of changing the air-fuel ratio by said air-fuel ratio changing means;

oxygen amount-$NO_x$ amount detecting means for detecting the sum of an amount of oxygen stored in the $NO_x$ absorbent and an amount of $NO_x$ absorbed in the $NO_x$ absorbent on the basis of the output signal of said air-fuel ratio detecting means after the air-fuel ratio of exhaust gas flowing into the $NO_x$ absorbent is changed over from lean to rich by said air-fuel ratio control means;

$NO_x$ amount calculating means for calculating an entire amount of $NO_x$ absorbed in the $NO_x$ absorbent by subtracting the amount of oxygen detected by said oxygen amount detecting means from the sum of the amount of oxygen and the amount of $NO_x$; and correction value calculating means for calculating a correction value for said estimated amount of $NO_x$, which correction value is a value whereby said estimated amount of $NO_x$ corrected by said correction value when the air-fuel ratio of exhaust gas flowing into the $NO_x$ absorbent is changed from lean to rich by said air-fuel ratio control means indicates said entire amount of $NO_x$ calculated by said $NO_x$ amount calculating means, said air-fuel ratio control means changing over the air-fuel ratio of exhaust gas flowing into the $NO_x$ absorbent from lean to rich when said estimated amount of $NO_x$ corrected by said correction value exceeds a predetermined set value.

22. A device as set forth in claim 21, wherein said estimating means finds the estimated amount of the $NO_x$ by increasing the amount of storage of $NO_x$ in accordance with the amount of absorption of $NO_x$ determined by the engine operating state when the air-fuel ratio of the exhaust gas flowing into the $NO_x$ absorbent is lean and decreasing the amount of storage of $NO_x$ in accordance with the amount of release of $NO_x$ determined by the engine operating state when the air-fuel ratio of the exhaust gas flowing into the $NO_x$ absorbent is rich.

23. A device as set forth in claim 22, wherein said amount of absorption of $NO_x$ determined according to the engine operating state is a function of the engine speed and the engine load.

24. A device as set forth in claim 22, wherein said $NO_x$ releasing amount determined according to the engine operating state is proportional to the excess fuel amount.

25. A device according to claim 21, wherein said air-fuel ratio detecting means generates an output signal indicating that the air-fuel ratio of the exhaust gas flowing into the $NO_x$ absorbent is slightly lean during a period for which the oxygen and $NO_x$ are released from the $NO_x$ absorbent after the air-fuel ratio of the exhaust gas is changed from lean to rich and generates an output signal indicating that the air-fuel ratio is rich when the oxygen and $NO_x$ releasing action from the $NO_x$ absorbent is completed.

26. A device as set forth in claim 25, wherein said air-fuel ratio detecting means comprises an air-fuel ratio detection sensor which increases its output current proportional to the increase of the air-fuel ratio.

27. A device as set forth in claim 25, wherein said oxygen and $NO_x$ amount calculating means decreases the sum of the amount of storage of oxygen and the amount of storage of $NO_x$ in accordance with the sum of the amount of release of oxygen and the amount of release of $NO_x$ determined according to the engine operating state during a period from when the air-fuel ratio of the exhaust gas flowing into the $NO_x$ absorbent is changed from lean to rich by said air-fuel ratio control means to when said air-fuel ratio detecting means generates the output signal indicating that the air-fuel ratio is rich and thereby calculates the sum of the entire amount of oxygen and the entire amount of $NO_x$ stored in the $NO_x$ absorbent.

28. A device as set forth in claim 27, wherein said sum of the amount of release of oxygen and amount of release of $NO_x$ determined according to the engine operating state is proportional to the excess fuel amount.

29. A device as set forth in claim 21, wherein when defining the estimated amount of $NO_x$ estimated by said air-fuel ratio control means as $\Sigma NO_x$ and defining the correction value calculated by said correction value calculating means as KX, the estimated amount of $NO_x$ $\Sigma NKX$ corrected by said correction value is represented by the following equation:

$$\Sigma NKX = KX \cdot \Sigma NO_x.$$

30. A device as set forth in claim 29, wherein when defining said entire amount of $NO_x$ calculated by said $NO_x$ amount calculating means as $XNO_x$, said correction value KX is updated on the basis of the following equation:

$$KX = KX \cdot \Sigma XNO_x / \Sigma NKX.$$

31. A device as set forth in claim 30, wherein when the difference between the estimated amount $\Sigma NKX$ of $NO_x$ corrected by said correction value and said entire amount $XNO_x$ of $NO_x$ is larger than a predetermined value, said correction value KX is updated.

32. A device as set forth in claim 21, wherein the predetermined set value in the air-fuel ratio control means is larger than the maximum amount of absorption of $NO_x$ of the $NO_x$ absorbent and the degree of deterioration of the $NO_x$ absorbing ability of the $NO_x$ absorbent is judged based on the entire amount of $NO_x$ calculated by the $NO_x$ amount calculating means.

33. A device as set forth in claim 32, wherein said predetermined set value is made larger than said entire amount of $NO_x$ by exactly a predetermined proportion.

34. A device as set forth in claim 33, wherein said proportion is larger than 1.0 and smaller than 1.3.

35. A device as set forth in claim 21, wherein the frequency of the air-fuel ratio of the exhaust gas flowing into the $NO_x$ absorbent being changed from lean to rich by the air-fuel ratio changing means is lower than the frequency of the air-fuel ratio of the exhaust gas flowing into the $NO_x$ absorbent being changed from lean to rich by said air-fuel ratio changing means.

* * * * *